(12) United States Patent
Gubbi et al.

(10) Patent No.: US 6,865,609 B1
(45) Date of Patent: Mar. 8, 2005

(54) MULTIMEDIA EXTENSIONS FOR WIRELESS LOCAL AREA NETWORK

(75) Inventors: Rajugopal R. Gubbi, Fair Oaks, CA (US); Gregory H. Parks, Folsom, CA (US)

(73) Assignee: ShareWave, Inc., El Dorado Hills, CA (US)

(*) Notice: Subject to any disclaimer, the term of this patent is extended or adjusted under 35 U.S.C. 154(b) by 854 days.

(21) Appl. No.: 09/614,833

(22) Filed: Jul. 12, 2000

Related U.S. Application Data

(60) Provisional application No. 60/191,636, filed on Mar. 23, 2000, and provisional application No. 60/149,518, filed on Aug. 17, 1999.

(51) Int. Cl.$^7$ .............................................. G06F 15/16
(52) U.S. Cl. ...................... 709/230; 709/227; 370/349; 370/469
(58) Field of Search ................................ 790/230, 227; 370/349, 469, 392, 401, 432, 337, 212, 274; 709/217, 230, 246, 227; 455/509; 380/212

(56) References Cited

U.S. PATENT DOCUMENTS

| | | | |
|---|---|---|---|
| 4,744,080 A | * 5/1988 | Brennand et al. | 380/212 |
| 5,148,482 A | * 9/1992 | Bocci et al. | 380/274 |
| 5,384,777 A | * 1/1995 | Ahmadi et al. | 370/337 |
| 5,519,640 A | 5/1996 | Ganesan et al. | |
| 5,594,732 A | * 1/1997 | Bell et al. | 370/401 |
| 5,630,061 A | * 5/1997 | Richter et al. | 709/227 |

(List continued on next page.)

FOREIGN PATENT DOCUMENTS

| | | |
|---|---|---|
| GB | 2 331 600 A | 5/1999 |
| WO | WO 97/08838 | 3/1997 |

OTHER PUBLICATIONS

Broadcast/Multicast MPEG-2 Video over Broadband Fixed Wireless Access NEtwork, Ma et al; IEEE 1998.*
RFC2467; Crawford, 1998: http:/www.faqs.org/rfcs/rfc2467.html.*
Transmission of MPEG-2 Streams over Non-Guaranteed Quality ..–Basso, Cash, Civanlar (1997); www.cs.columbia.edu/~hgs/papers/others/Bass9709_Transmission.ps.gz.*

(List continued on next page.)

*Primary Examiner*—Thong Vu
(74) *Attorney, Agent, or Firm*—Thompson & Knight LLP; James J. Murphy

(57) ABSTRACT

A scheme for wireless local area networks provides multimedia extensions for high rate applications. Some of the main extensions provided are the following: The MAC header is extended to include the components for multimedia support. The network topology extensions include tighter definition of the PC, peer-peer connections during CFP, alternate PC and proxy PC. The Quality of Service (QoS) related extensions include the simplifying the operation during CFP, support of streams, stream priority, synchronization of TDM transmissions by devices during CFP, dynamic bandwidth management, channel protection using error control coding and negotiable retransmission parameters. By dynamically negotiating for the priority, bandwidth and the retransmission parameters for each stream separately, the latency control is achieved. There are also proposed extensions to the operation of DCF-only stations in order to better their inter-operation with multimedia capable devices.

29 Claims, 10 Drawing Sheets

U.S. PATENT DOCUMENTS

| | | | | |
|---|---|---|---|---|
| 5,684,791 A | * | 11/1997 | Raychaudhuri et al. | 370/310.2 |
| 5,802,064 A | * | 9/1998 | Lieberman | 370/469 |
| 5,905,442 A | | 5/1999 | Mosebrook et al. | |
| 5,923,662 A | * | 7/1999 | Stirling et al. | 370/432 |
| 6,031,832 A | | 2/2000 | Turina | |
| 6,052,594 A | | 4/2000 | Chuang et al. | |
| 6,181,947 B1 | * | 1/2001 | Du et al. | 455/509 |
| 6,493,340 B1 | * | 12/2002 | Kawanaka | 370/392 |
| 6,546,001 B1 | * | 4/2003 | Semper et al. | 370/349 |
| 6,671,287 B1 | * | 12/2003 | Huttunen et al. | 370/469 |

OTHER PUBLICATIONS

"Multimedia Streams and Quality of Service In the Next Generation Wireless Hom Networks" by Rajugopal Gubbi, pp. 232–235 of 1999 IEEE International Workshop San Diego, California Nov. 15, 1999.

"Isochronous Services in Home Multimedia Networks" by Rajugopal Gubbi, pp. 534–539 of 1999 IEEE Pacific Rim Conference Victoria, British Columbia, Canada Aug., 1999.

* cited by examiner

| Octets | 2 | 2 | 6 | 6 | 6 | 2 | 6 | 3 | 0-2312 | 4 |
|---|---|---|---|---|---|---|---|---|---|---|
| | Frame Control | Duration/ ID | Addr1 | Addr2 | Addr3 | Sequence Control | Addr4 | MM-control | Frame Body | FCS |

(a) Multimedia frame format

| | B0 | | | | | B23 |
|---|---|---|---|---|---|---|
| | Frame Position (FP) | Pad Bytes | BSS-SID | Stream Index | Stream Frame number | |
| Bits | 2 | 2 | 4 | 8 | 8 | |

(b) Multimedia Control field (proposed new field)

FIG. 3

(a) Data for packets are collected and sorted into buffer queues according to payload differentiation (b) Packets are then transmitted according to an arbitration sheme

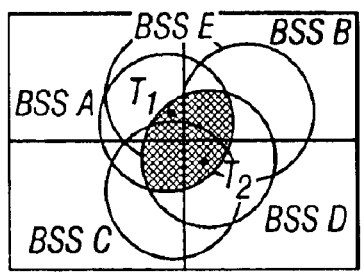
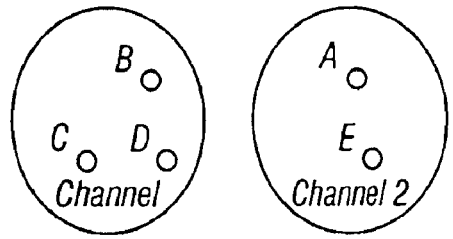

FIG. 12A            FIG. 12B

- BBS B comes up first and assumes all zero BSS-SID in channel 1 with 10% bandwidth utilization
- BBS A comes up first and assumes all zero BSS-SID in channel 2 with 80% bandwidth utilization
- BSS D comes up :
  - Detect both channels being busy
  - Detect channel-1 with low bandwidth utilization and
  - Requests 30% bandwidth in one channel-1
  - BSS B and D share Channel 1 with 10% and 30% bandwidth usage respectively

- BSS C comes up:
  - Detect both channels being busy
  - Detect channel-1 with low bandwidth utilization and
  - Requests 40% bandwidth in one channel-1
  - BSS B, C and D share channel 1 with 10%, 40% and 30% bandwidth usage respectively

- BSS E (not shown in picture) comes up:
  - Detects both channels being busy
  - Detects channel-1 and channel-2 with approximately same bandwidth utilization
  - Detects channel-2 with lower number of BSSs
  - Request 40% bandwidth in channel-2
  - BSS A and E share Channel 2 with 60% and 40% bandwidth usage respectively

FIG. 12

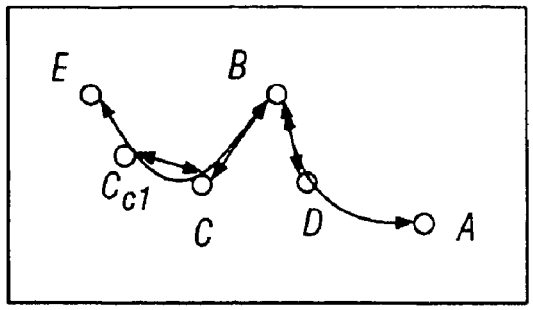

- BSS B comes up first and assumes all zero BSS-SID
- BSS D comes up next and requests bandwidth sharing with B
- BSS D comes up next and requests bandwidth sharing with B and D
- BSS A comes up:
  - BSS B can not detect A and/or A can not detect B
  - BSS D detects both and reports to B that A is operating in the same channel
  - B and D to be proxy coordinator and send response to the request of D for bandwidth sharing
  - D acts as tunnel between B and A
  - A gets a invitation from B to join the already group existing group B, C and D
  - A gets assigned an BSS-SID and the synchronization parameters with respect to D's transmission of beacon

- BSS E comes up:
  - Except $C_{c1}$, no other device can detect E and or otherwise
  - E tries to use another channel and fails
  - There is only one option to E and that is to join the same group formed above, else it will be interfering with $C_{c1}$
  - $C_{c1}$ detects request from E and reports to C that E is operating in the same channel
  - C tunnels the information to B
  - B assigns $C_{c1}$ to be proxy coordinator and sends request to C for permission
  - C agrees to the request and provides the permission
  - C and $C_{c1}$ together form a tunnel between B and E
  - E gets assigned an BSS-SID and the synchronization parameters with respect to $C_{c1}$'s transmission of first packet

*FIG. 13*

MULTIMEDIA EXTENSIONS FOR WIRELESS LOCAL AREA NETWORK

RELATED APPLICATIONS

The present application is related to and hereby claims the priority benefit of the following provisional applications: Application No. 60/149,518, filed Aug. 17, 1999, by Rajugopal R. Gubbi for "Multimedia Extensions for Wireless Local Area Networks", and Application No. 60/191,636, filed Mar. 23, 2000 by Rajugopal R. Gubbi for "Whitecap™: Quality of Service Enhancements to 802.11-MAC".

FIELD OF THE INVENTION

The present invention relates generally to a scheme for communications within a computer network and, in particular, to a scheme for accommodating multimedia within a wireless computer network such as a wireless local area network (LAN).

BACKGROUND

Modern computer networks allow for inter-communication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Furthermore, interference from existing appliances, such as televisions, cellular telephones, wireless telephones and the like may be experienced. Thus, analog wireless communication links offer less than optimum performance for a home environment.

In co-pending application, Ser. No. 09/151,579, which is incorporated herein by reference, a computer network employing a digital, wireless communication link adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infrared links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each fame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/ reception), low bandwidth data and/or command (Cmd.) packets. Slot Q is left quiet so that a new client may insert a request packet when the new client seeks to login to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/ reduce the number of ECC bits to cope with the new channel conditions. Hence, depending on whether the information rate at the source is altered, it may require a dynamic change to the forward and backward bandwidth allocation.

Another scheme for communicatively coupling components of a computer network is described in a standards document promulgated by the Institute of Electrical and Electronic Engineers (IEEE), entitled "Information technology—Telecommunications and information exchange between systems—Local and metropolitan area networks", currently in forms IEEE 802.11-1997 and an approved draft IEEE 802.11-1999 (hereinafter collectively referred to as the 802.11 specification). One drawback of this scheme, however, is that it does not make accommodations for the transport of multimedia information within a network, as does the scheme described in the above-cited co-pending application.

SUMMARY OF THE INVENTION

The present scheme is offered as a supplement to the scheme proposed in the standards document 802.11 for wireless local area networks promulgated by the Institute of Electrical and Electronic Engineers (IEEE) and provides multimedia extensions for high rate applications. Some of the main extensions proposed are the following: The MAC header is extended to include the components for multimedia support. The network topology extensions include tighter definition of the PC, peer-peer connections during CFP, alternate PC and proxy PC. The Quality of Service (QoS) related extensions include the simplifying the operation during CFP, support of streams, stream priority, synchronization of TDM transmissions by devices during CFP, dynamic bandwidth management, channel protection using error control coding and negotiable retransmission parameters. By dynamically negotiating for the priority, bandwidth and the retransmission parameters for each stream separately, the latency control is achieved. There are also proposed extensions to the operation of DCF-only stations in order to better their inter-operation with multimedia capable devices.

In one embodiment, access of computer network components to a network's communication medium as specified by a medium access control (MAC) protocol, the MAC protocol describing a MAC header comprising multimedia (MM) extensions, including a MM control field, is controlled to facilitate the communication of MM data between the network components.

The MM control field may be a frame position subfield and/or a subfield to indicate the number of bytes padded with zeroes in the current frame. Alternatively, it may be used to (1) indicate an identification assigned to a group of network components communicatively coupled with a one network component designated as a point coordinator; (2) indicate an index number for a multimedia data stream being transmitted between the network components; and/or (3) indicate a frame number of a multimedia data stream frame associated with said MM control field. Such a field may be 24 bits long and be made up of several subfields. In one case, the MM control field is the last MAC header field transmitted before transmitting a frame body.

Such communications may be via a wireless medium and may involve the use of radio frequency communication via frequency hopping spread spectrum (e.g., direct sequence spread spectrum) schemes.

A multimedia capability indicator may be included in a management frame. The MAC protocol may define a capability field within a management frame, the capability field including information regarding the network component multimedia capabilities. Also, a set of parameters included in the initial communications between two network components may indicate whether the channel of communications is shared and/or the type of network component including proxy coordinator and master coordinator.

A definition for a multimedia command frame is specified. The multimedia command frame may include multiple commands and acknowledgements transmitted from one network component to other network components. Indeed, one network component may group two or more multimedia commands intended for a second network component in a command sub-block. The multimedia command frame may also include a destination address and a command sub-block length.

A frame control field (FC) wherein a type for multimedia data communication may be indicated may also be included. The FC field may consist of the first 16 bits of the MAC header transmitted by the network component.

Another embodiment provides an interface between a computer system and a computer network. The interface may be regarded as an implementation of a medium access control (MAC) protocol wherein multimedia data communication extensions, including a multimedia control field, are available for communicating multimedia data to or from other network components. Examples of such an interface include a network interface card (NIC), a means for accessing a wireless medium, e.g., via radio frequency communications using frequency hopping spread spectrum techniques such as direct sequence spread spectrum techniques, or via infrared communications.

A further embodiment provides a system communicatively coupled to other systems in a computer network. This system may include a network interface that implements a medium access control (MAC) protocol to control access to the network's medium, the MAC protocol defining a MAC header that comprises multimedia (MM) data communication extensions, including a MM control field, the MM data communication extensions available for communicating multimedia data to or from other network components or systems communicatively coupled to the network.

Another embodiment includes a machine-readable medium (e.g., a memory or other storage medium) that provides instructions, which when executed by a machine, cause said machine to communicate in a computer network by accessing the communication medium in accordance to a medium access control (MAC) protocol that describes a MAC header comprising multimedia (MM) extensions, including a MM control field.

In a further embodiment computer network components communicate following a point coordinator function with contention free and non-contention free periods. In such a network, a multimedia capable computer network component includes means for supporting DCF based contention period communications; means for communicating with non multimedia capable network components only during the contention period; and means for establishing connections and negotiating bandwidth in the contention period using DCF mechanisms. In addition, any or all of the following features may be included in the network component: means for recognizing and using as time reference a beacon from a point coordinator network component; means for periodically providing its bandwidth requirements to the point coordinator network component; means for establishing multimedia data stream connections with other multimedia capable network components; means for supporting error correction and retransmission mechanisms; means for continuously measuring channel status and periodically providing said measurements to the point coordinator network component; means for communicating without receiving a polling signal from the point coordinator network component; means for optionally measure and report collisions during non-contention free periods; and/or means for communicating to two or more such other network components during a contention free period. The network component may be a point coordinator network component and/or may communicatively couple one or more other network components with a point coordinator network component.

Such a point coordinator network component may include means for transmitting beacon frames; and means for allocating transmission slots to different network components within the contention free period of communications. Additionally, any or all of the following may be included: means for monitoring bandwidth utilization by the network components during contention free periods; means for renegotiating bandwidth requirements with other network components to optimize bandwidth utilization; means for dynamically changing the communication channel used by all the network components associated to said point coordinator; means for negotiating with point coordinator network components associated with other sets of network components such that two or more sets of network components can communicate within the same channel; means for monitoring the contention period of communications and assuring that there is available bandwidth for at least one data frame plus acknowledgement in said contention period.

Of course, such a network component may be used as an alternate point coordinator, for example according to a voting scheme among other such multimedia capable network components.

BRIEF DESCRIPTION OF THE DRAWINGS

The present invention is illustrated by way of example, and not limitation, in the figures of the accompanying drawings in which like reference numerals refer to similar elements and in which:

FIG. 3 illustrates a (a) proposed multimedia frame format and (b) multimedia control field description in accordance with an embodiment of the present invention;

FIG. 12 illustrates overlapping BSSs sharing the same channel in an example of two channel PHY medium in accordance with an embodiment of the present invention; and FIG. 13 illustrates the operation of a proxy-coordinator in accordance with an embodiment of the present invention.

DETAILED DESCRIPTION

Figure 1:
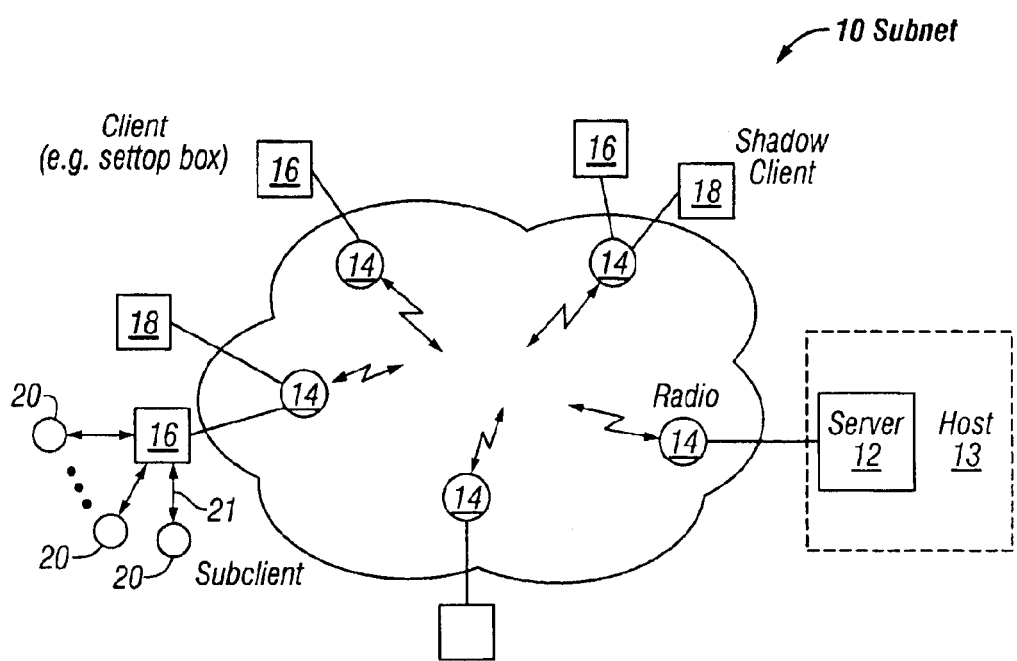
FIG. 1 illustrates a general overview of a wireless computer network.
Figure 2:
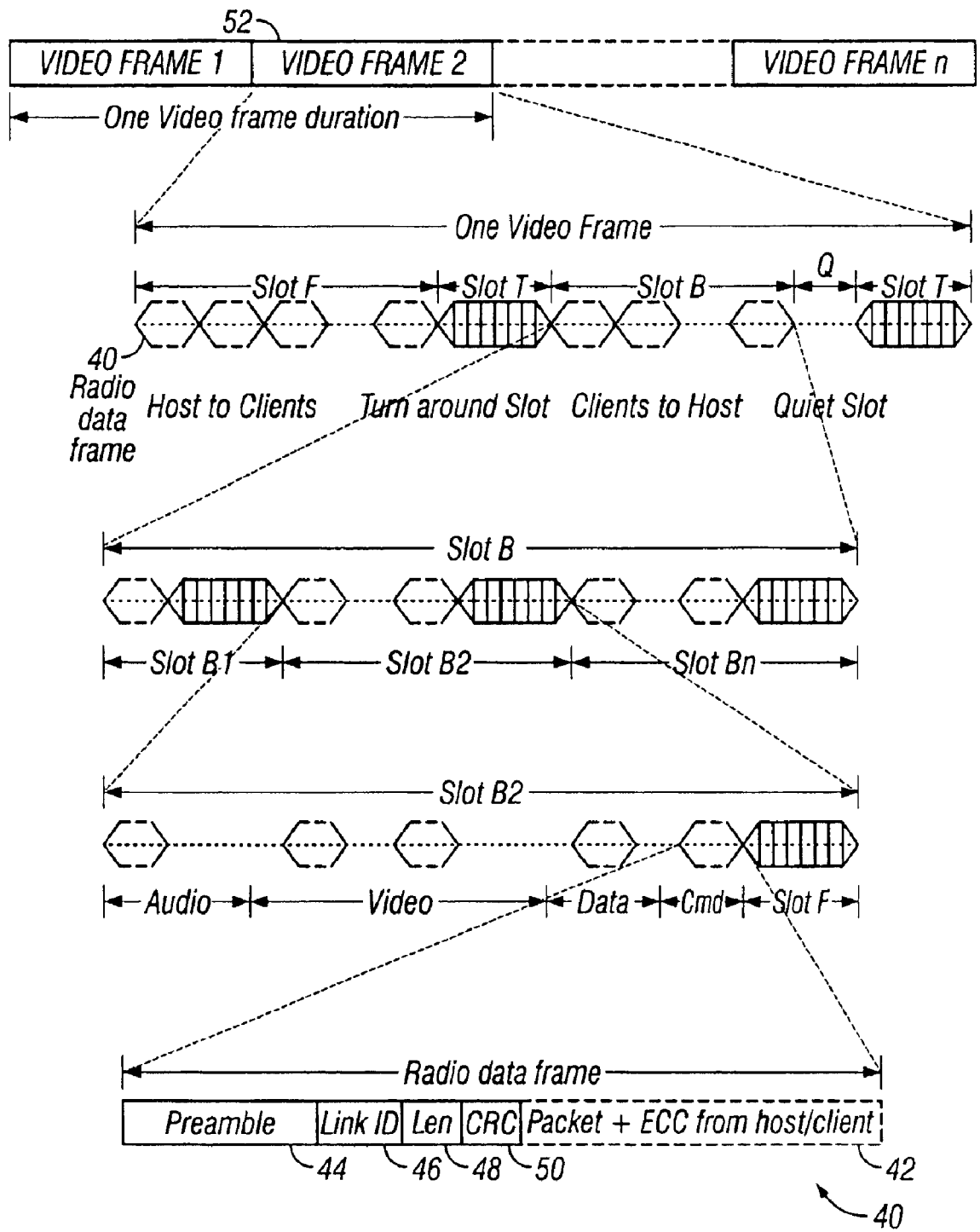
FIG. 2 illustrates a slotted link structure for communications with the wireless network of FIG. 1.

A set of multimedia extensions is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

1. Introduction

An 802.11-compliant wireless LAN (WLAN) provides good support for device connection, device authentication and to date the relevant specifications defining operations of such environments have concentrated mainly on transportation of asynchronous data over the wireless channel. These features of 802.11 WLANs are sufficient for enterprise network applications. On the other hand, the scheme described in the above-cited co-pending application (hereinafter referred to as the "Whitecap" scheme) is designed from ground up for transportation of multimedia data streams with all the multimedia services required from the WLAN. Recent efforts in 802.11 and Whitecap architectures (developed by the assignee of the present application) are leading to higher bit rates and better products in the market. Many different manufacturers are able to produce many consumer electronic devices and provide the advantage of flexibility of a wireless solution at home. Nevertheless the incompatibilities among these wireless LANs have limited the acceptance of wireless networks in the home market. With the growth of home market, it is vital for WLANs to have extensions to support multimedia data streams, such as CD quality audio and video, to succeed in the home market. Hence a smart merger of these two architectures would greatly benefit the end user and would be a welcome in the market. Keeping this in mind, this present scheme merges the mechanisms of Whitecap into the currently defined point coordinator function of 802.11 WLANs. The proposed extensions to the point coordinator function (PCF) can be broadly categorized into two groups; network topology support and Quality of Service (QoS) for multimedia data. Additionally this application presents a set of basic of services that can support the future developments in the field.

For the benefit of the reader, various sections in this document are briefed here. The first two sections in this proposal are meant to introduce the reader to the topic of multimedia support in 802.11 WLANs and provide clarifications on thoughts of using the point coordinator function (PCF) to support multimedia data transfers. Section 2 is devoted to viewing PCF as the multimedia support feature and describing the issues involved in doing so. To assist in understanding the various extensions proposed, section 3 defines a set of required new terminology.

An important requirement in transporting multimedia data is guaranteeing the data throughput with error correction and some retransmissions accounted for. Additionally, to successfully operate in the home environment the different networks established in neighboring environments need to share the bandwidth in the same channel in an organized way without increasing the rate of packet collisions. Hence, there is a significant need for effective bandwidth management and to support QoS in WLANs. While these extensions are attractive, they cannot be supported with the MAC header as defined currently for 802.11 WLANs. Hence, section 4 is devoted to describing the extensions to the MAC header to support the multimedia data transfers.

Section 5 presents the proposed extensions to enhance the PCF to provide multimedia services. Backwards compatibility to ensure interoperability with existing devices is an important part of any proposal. Accordingly, this application takes such factors into consideration and maintains backwards compatibility in communications between MMS and DCF-only stations. Further, section 6 proposes a several enhancements for future DCF-only stations that further improve the efficiency of those stations while keeping them compatible with the present 802.11 WLAN definition of such stations.

2. PCF as Multimedia Data Transport Functionality

The operation of the PCF as defined in the current 802.11 standard provides for so-called contention free periods (CFP) during network operations. However as PCF was mainly designed to transfer low rate voice traffic over the WLAN, it has the following drawbacks when used to transport multimedia data over the WLAN.

PCF does not guarantee the availability of the beacon period itself as a DCF-only station can manage to occupy the channel and delay the beacon arbitrarily. These delays can be as large as the maximum size of the data frame that is supported in the 802.11 standard. Additionally, the point coordinator (PC) uses a DIFS plus a random back-off delay to start a CFP when the initial beacon is delayed because of deferral due to a busy medium. This further complicates the problem of providing a periodic opportunity for MMSs for their data transmission.

PCF is an AP-centric data transfer method and it does not provide peer-to-peer data transfers during the CFP. In multimedia WLANs, this kind of star topology adds unacceptable latencies and unnecessarily adds to the burden on network efficiency, as the AP has to behave like data repeater between the two stations wishing to exchange data during the CFP.

There is a risk of repeated collisions if multiple, overlapping, PCs operate in the same PHY channel and this can cause repeated collisions. There is further added complication of PCs being required to lose control of the medium for a random number of slot times periodically. As the home market expands and the wireless stations are used by apartment dwellers, the throughput reduction due to this problem becomes unacceptable for the user.

In addition to the above, two sets of devices belonging to the same user can form two BSSs each with a PC. This causes an unnecessary increase in beacon traffic and exacerbates other problems due to collisions. There is no support for the quality of service (QoS) that is essential in supporting multimedia data traffic over a WLAN.

If the operating PHY medium gets too noisy, there is no defined mechanism for the PC to look for a better channel and move the network operations to this new channel. This is extremely important when multimedia data is being transported over an inherently noise prone WLAN medium.

When a PC is polling for an asynchronous data stream and a multimedia data stream, like audio/video, there are no defined mechanisms for a station streaming multimedia to get priority in channel usage. This can cause problems such as dropped video frames or audio "clicks" simply because there is competition for the channel (e.g., from a print job running in another room).

There is no defined mechanism for a station with a larger data rate to get priority over data stations with a smaller data rate when both data streams are of equal importance. A good example of this in the home environment is where one station is streaming audio to speakers in the kitchen say, while another station is streaming audio-video (AV), like a DVD movie, to a television.

3. Proposed New Definitions

To assist in understanding the various extensions proposed this section the following definitions of the new terminology used in this application are set forth below.

MMS: Multimedia station having all the extensions recommended in this application.

PC: Point coordinator with multimedia capability. During installation a device, preferably non-mobile, is designated as the PC. All other PC-capable devices are designated as APCs.

Alternate point coordinator (APC): An MS that is capable of becoming a PC.

Proxy point coordinator (PPC): An MMS capable of becoming a PC, but currently providing tunnel service between an MMS and an already operating PC.

Superframe: A superframe is defined as the periodically occurring frame starting from the beacon transmission of PC and containing transmissions of all MMSs within the current BSS, followed by the transmissions by all the overlapping BSSs that are sharing the same PHY channel.

BSS-SID: BSS-SID is the session ID of the BSS. This is applicable when multiple overlapping BSSs are sharing the same channel.

MC: Master coordinator. An MC is the PC with the BSS-SID equal to zero. This PC provides the beacon that marks the beginning of the superframe and also provides the management resources for bandwidth sharing among the overlapping BSSs that are currently sharing the same PHY channel.

Proxy coordinator: A proxy coordinator is an MMS or PC, providing a tunnel service between the operating MC and a new incoming PC to share the same channel during the CFP.

4. Extensions to MAC Header and Frame Formats

The proposed multimedia extensions require a multimedia control (MM-control) field in the frame header. The data frame header is enhanced to contain the multimedia control field as shown in FIG. 3. The multimedia control field may be 3 bytes (24 bits) long and is positioned at the end of the currently defined MAC header as an extension. Other than the Frame control and the MM-control fields, all the other fields are used in the same manner as currently defined in the 802.11 specification for the data frame. The frame body in the multimedia command frame also assumes a new structure as described in section 4.3.

4.1 Frame Control Field

The frame control field format is consistent with the currently defined format with the use of currently reserved frame type and subtype values for multimedia data transfers as shown in Table 1. The reserved frame type '11' is used for multimedia extensions and subtypes of 0000-0110 are used to represent various multimedia data types.

TABLE 1

Use of currently reserved frame type and subtypes for multimedia data transfers

| Type Value (b3 b2) | Type Description | Subtype value (b7 b6 b5 b4) | Subtype description |
| --- | --- | --- | --- |
| 01 | Control | 1000 | Change Channel Frame |
| 01 | Control | 1001 | Change Channel Ack Frame |
| 11 | Multimedia | 0000 | Multimedia Command Frame |
| 11 | Multimedia | 0001 | Network Feature Update Frame |
| 11 | Multimedia | 0010 | Voice Frame |
| 11 | Multimedia | 0011 | Audio Frame |
| 11 | Multimedia | 0100 | Video Frame |
| 11 | Multimedia | 0101 | Real time Data Frame |
| 11 | Multimedia | 0110 | Data Frame |
| 11 | Multimedia | 0111–1111 | Reserved |

The change channel frame and its acknowledgement (Ack) frames are kept as subtypes in the control field. This is meant to help, in the future, in adopting the channel change mechanism for DCF-only stations, with appropriate MAC level changes as discussed in section 6.

4.2 Multimedia Control Field

The MM-control field is 3 bytes long and contains 5 sub-fields: frame position field (2 bits), Pad bytes (2 bits), BSS session ID (BSS-SID, 4 bits), Stream index (SI, 8 bits) and stream frame number (SFN, 8 bits). The frame position sub-field is two bits long and indicates the position of the current frame. This sub-field is used to help achieve synchronization between the transmissions of stations during a CFP. The value 00 is used to indicate the first frame in the current transmission slot from the associated source device. The value 11 is used to indicate the last frame in the current transmission slot from the associated source device. The value 01 is used to indicate that there are more than two frames following the current packet. The value 10 is used to indicate that there is only one another frame following the current packet.

The Pad bytes sub-field indicates how many bytes are padded in the current frame to make the entire frame DWORD (4 bytes) aligned. This sub-field helps in easing the hardware implementation of the MACs by letting the hardware handle DWORD aligned frames instead of byte-aligned frames. At the transmitter, the MAC hardware is expected to fill this sub-field and pad bytes at the end of the frame after the FCS field. At the receiver, the correct length of the frame is determined after deleting or ignoring the padded bytes.

The BSS session ID is a four-bit identifier and is dynamically assigned to the group of stations associated with a PC, including the PC itself. This sub-field is used when overlapping PCs need to operate in the same physical channel. This sub-field allows up to 15 overlapping PCs to share the bandwidth in the same channel as described in section 5.2.5.3. An all ONE value of BSS-SID is reserved for the purpose of initial negotiations.

The stream index is used in conjunction with MAC addresses and the MM-frame subtype to uniquely identify a data stream. A device can generate or consume up to 255 streams of the same packet type. Usage of this field is discussed in section 5.2.2.

The stream frame number is used to synchronize any two streams originating from a device. Details on the use of this field are described in section 5.2.2.

4.3 Multimedia Command Frame Format

Figure 4:
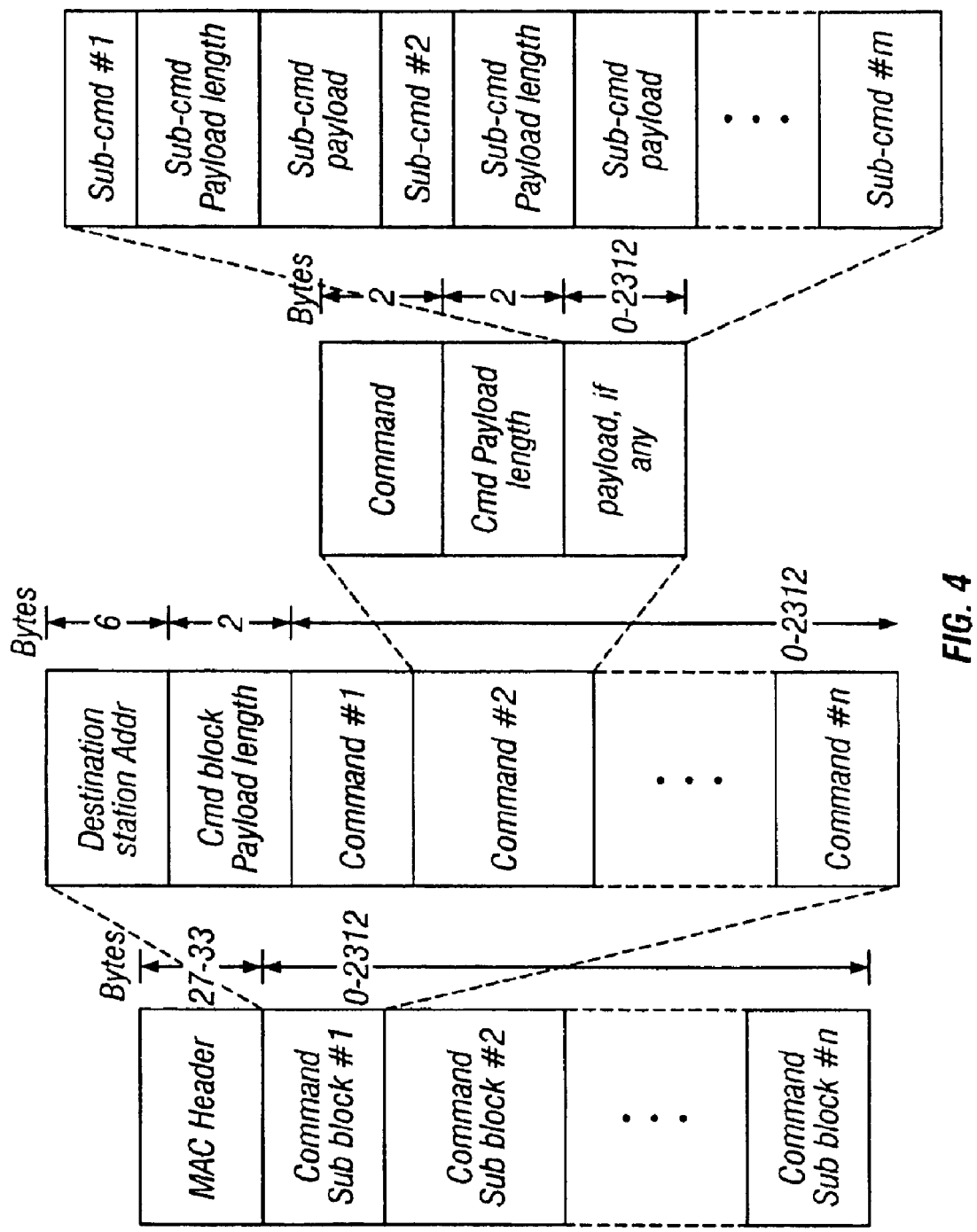
FIG. 4 illustrates a structure of the multimedia commands and sub-commands in an MM-command frame in accordance with an embodiment of the present invention.

A multimedia frame with a subtype of "command" is a frame of multiple commands and acknowledgements as shown in FIG. 4. Various commands intended for a device are collected together as command sub-blocks. Multiple numbers of these sub-blocks along with the destination address and the sub-block length are combined together to form the multimedia command frame. Various commands relating to the service extensions proposed in section 5 can be defined.

The frame subtype network feature update is used to transport the feature update packets to programmable MACs on an MMS from any other MMS that has access to updated codes or parameters. The subtypes of voice, audio, video, real-time data and data are used to transport the actual multimedia data within a BSS. These frame subtypes signify the characteristics of the incoming traffic at the destination MMS. The distinction of real-time data and data, asynchronous by default, is required to allow for different latency requirements of the two data types at both the source device and the destination device.

4.4 Capability Information in Management Frames

The capability information in the management frames needs to contain the MM capability, the PPC and an indication on overlapping BSS sharing the channel. Hence, bit 5 in the capability information field may be used as an "MM capable" bit. When an STA sets this but to '1' in its association/re-association frame it is meant that it is an MMS and is currently requesting PC association. When an AP sets this bit, it means it has the capability of a PC. If an MMS does not want CFP operation, it can simply set this bit to zero and act like a basic STA using the DCF mechanisms.

4.5 DS Parameter Set

The interpretation of the current channel field in the DS parameter set is revised under the present scheme to indicate the next channel number. This change is useful to enable dynamic channel changes.

4.6 Beacon and Probe Response Frame Body

Figure 5:
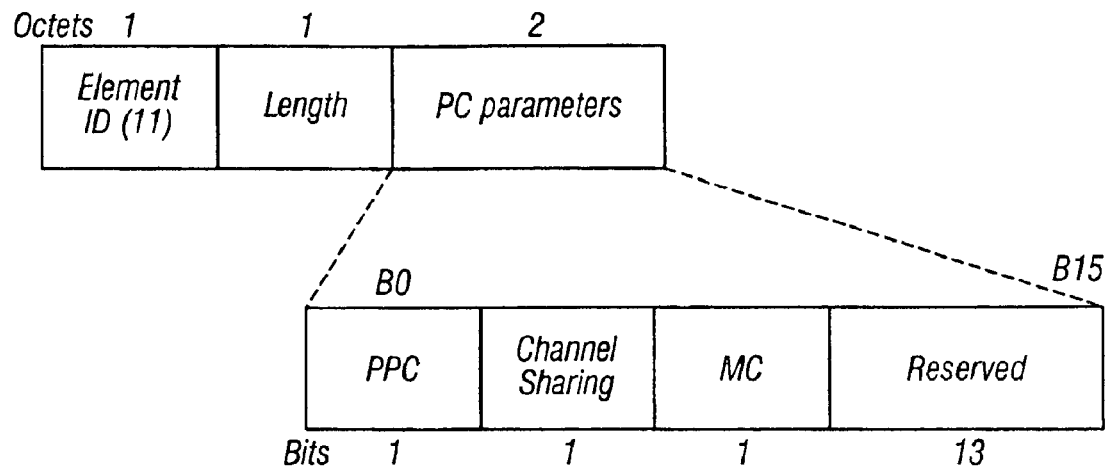
FIG. 5 illustrates a PC parameter set in beacon frame and probe response frame body in accordance with an embodiment of the present invention.

The beacon and the probe response frames are should contain another element called "PC parameter set". The element ID for PC parameter set may be 7. The order of this element in a beacon frame may be 11 and in a probe response frame may be 10. This parameter set indicates the parameters with which the current PC is operating and its structure is shown in FIG. 5. This element may have 3 valid bits (B0–B2). Note that this extension assumes that all the current STAs are able to drop those and only those elements that are not currently defined in the 802.11 standard and use the rest of the beacon frame and probe response frames.

Bit 0 is used to indicate whether the beacon is from a PPC. Identifying this bit in a beacon helps the MMSs recognize that a PPC is nearby and hence they can wait for the PPC to respond if the response from a PC is not available.

Bit 1 is used to indicate whether the BSS is currently sharing channel with other BSSs.

Bit 2 is used to indicate whether the current PC is an MC when multiple BSSs are sharing the same channel.

The rest of the bits in this element are reserved.

4.7 New Reason Code for Disassociation

A new reason code is required when a PC disassociates an MMS when the MMS does not adhere to the negotiated association agreements such as the duration of transmission duration as described in section 5.2.5.2. A PC may use reason code 10, currently reserved, as a code for "Disassociation as the MMS does not adhere to the association agreements."

5. Proposed Extension of Services for Multimedia Data Transportation

This section presents the proposed modifications that still make use of the beacon with its frame format left as defined currently in the 802.11 specifications. An important requirement in transporting multimedia data is guaranteeing data throughput with error correction and some retransmissions. Additionally, to successfully operate in the home environment the different networks established in neighboring environments need to share the bandwidth in the same channel in an organized way without increasing the rate of packet collisions. Hence there is a significant need for effective bandwidth management and to support QoS in WLANs. The proposed multimedia extensions are broadly classified into services related to enhancement of network topology and services achieving QoS. These extensions are described in the following sections.

5.1 Network Topology Related Extensions

This section describes the enhancements to the WLAN topology that are useful in supporting multimedia data transfers.

5.1.1 Definition of Multimedia Capable Station (MMS)

An MMS is a multimedia capable STA. An MMS should,

Support DCF-based contention period operations for backwards compatibility.

Communicate with non-MM STA's only during the contention period, as the acknowledgement from a non- MM STA can disrupt the time division multiplexed (TDM) behavior of the CFP transmissions.

Establish connections and negotiate for bandwidth in the contention period using DCF mechanisms.

Recognize a beacon from a PC and use it for time reference.

Make use of the allotted time slot in the CFP effectively and efficiently.

Provide a PC with needed bandwidth requirements periodically.

Establish the required stream connections with the other MMSs during the CFP.

Support forward error correction (FEC), CRC (cyclic redundancy checks) and retransmission mechanisms as discussed in section 5.2.6.

Measure the channel status continuously and provide the same as feedback to PC periodically.

Not expect polling by the PC. This application proposes removing the polling mechanism from the PCF as currently defined in the 802.11 specification for the reason that it unnecessarily contributes to bandwidth overhead. Additionally the removal of the polling mechanism from the PC 95 saves processing overhead at the PC.

An MMS can optionally measure and report collisions during a non-CFP so that q PC can optimize CFP versus non-CFP communications.

5.1.21 The Point Coordinator (PC)

5.1.2.1 Enhancements to the Point Coordinator

The proposed multimedia enhancements to PCs are described in the following bullets.

A PC is also an MMS.

Mandatory single PC for multimedia networks: in the present scheme that there is one and only one PC per network. During the network installation, the user should be able to select a device as a designated PC or, by default, the very first PC in the network may become the designated PC. Whenever there are no PCs, a capable MMS should be able to become a PC when a request for CFP operation is detected. When there are more than one PC capable STAs, then they should be required to vote among themselves and choose one among them to be the PC, depending on the available network resources on the PCs.

Responsibilities of sending beacon frames: The present scheme adopts the responsibilities as currently defined in the 802.11 specifications. The beacons provide the time reference to the MMSs for their transmissions.

Responsibility of allocating transmission slots to different stations within CFP: The PC is required to negotiate and/or allocate the transmission slot duration within a CFP for each MMS. The policies employed in the bandwidth request/negotiate/allocate are described in section 5.2.5.1.

Responsibility of channel monitoring: The PC is required to monitor the bandwidth utilization by the MMSs during a CFP and renegotiate the bandwidth, if required, so as to optimize the network utilization.

Dynamic channel change: The PC is required to measure the channel losses, receive the feedback on channel status from the individual MMSs and assess the channel conditions. If the current channel conditions are severe, the PC is required to momentarily pause the CFP operation and search for a better channel. Once a better channel is found, the PC is required to inform all the associated STAs in the current channel and move the network operations to the new channel. The same mechanism, but in a slightly different manner, may be used when the current channel is occupied and a new PC wishes to establish a CFP. The new PC should check other channels for a free channel before starting negotiations to share bandwidth with the currently operating PC during a CFP.

Responsibility of negotiating with the PC of another network for channel sharing: Due to the limited number of channels in a DS PHY, multiple PCs that do not authenticate each other need to be able to operate in the same PHY channel. A good example for this is where PCs from two different networks are located in physically close apartments in an apartment complex. Hence, when the operation of an unidentified PC in the same PHY channel is recognized by a PC trying to establish a CFP, the second PC should send management packets to the first PC and negotiate for CFP duration.

Responsibility of sharing bandwidth with pure-DCF stations: A PC should always monitor the contention period and makes sure there is at least one data frame plus acknowledgement duration left free in the contention period. This requirement is same as is currently defined in the 802.11 specifications.

5.1.2.2 Operation of PC

The PC in a BSS has complete control of the network operation during the CFP and is responsible for bandwidth allocation/monitoring, network synchronization and channel changing. An MMS may attempt to wake up the PC using repeated requests for CFP-bandwidth through an MM-command frame. The PC may then respond by sending a beacon as its response and transmitting an MM-command frame allocating the bandwidth and other synchronization parameters as described in section 5.2.4. This establishes the CFP operation between the PC and the MMS.

5.1.2.3 Alternate Point Coordinator (APC)

In any network architecture based on coordinator-station relations, it is very important to have backups to account for the failure of the coordinator. This is due to the fact that in the absence of PC beacons, the rest of the BSS will be non-functional. Thus, in the present scheme, a mechanism is recommended to hand over the responsibilities of the PC to an alternate point coordinator (APC) and thereby avoid the failure of the entire network. An APC is an MMS capable of being a PC, but not designated to be the default PC. When such a station is operating as a PC, all the responsibilities discussed in section 5.1.2 are applicable. On the other hand, when this station is not operating as a PC, then it simply behaves like an MMS as described in section 5.1.1.

To help in the hand over of responsibility of a PC to an APC, all APCs in a network are periodically updated with a table of currently operating MMSs and their operating parameters. If an APC is away/off and associates itself during an ongoing session, it either waits for the PC to provide an update or it can voluntarily request the same information. If there are multiple APCs volunteering to take over the responsibility of the PC, then these APCs should vote for the responsibility. This may be implemented by broadcasting a list of the available resources at each of these volunteering APCs. The APC with the maximum resources should then win the negotiation. This process can take multiple iterations of negotiations depending on the type of APCs and number of APCs present. If there is more than one device with equal resources at the final negotiation stage, then the device with the largest MAC address may be selected as the new PC.

A list of resources that may be used in this negotiation scheme is set forth in Table 2 and arranged in order of priority. Further, the NM-command should also contain the field to indicate whether the device was designated as the PC during its installation. The comparison is performed from top to bottom (of the listed parameters) and the decision is made whenever a better resource comparison is found. If there are multiple devices designated as PCs during installation, then similar negotiations among these devices may be had and the device with greater number of resources should win the negotiation. The other devices that are not devices designated as PC during installation leave the negotiation once such a device enters the fray. Three scenarios in which ad MMS replaced a current PC are discussed in the following sections.

TABLE 2

List of resources that may be used in selecting a volunteer for master device responsibilities.

| Resource ID — also serves as priority indicator | Resource description | Resource magnitude | Comparison rule |
|---|---|---|---|
| 1 | Transmission power | Default value is 5. Low power devices are marked 0 and the vendor can grade the rest depending on the PHY range. | Higher is preferred. For example a low power device should not be used as a PC. |
| 2 | Designated mode | 0: Default. No designation. 1: No designation, but capable of serving as PC. 2: User designated as APC. 3: user designated as a PC. | Higher is preferred. |
| 3 | Non-volatile storage through physical, wired connection | A class for this resource needs to be defined for every device with zero as default. Attachment to PC is graded as 10. A cable modem can get a grade between 1 and 10. The actual decision of the resource class is left to implementation | Higher class resource is preferred |
| 4 | # of outside connections | # of connections like ISP, cable modem etc. | Device with smaller # is preferred |
| 5 | # of currently active outside connections | # of outside connections that are actively used currently | Device with smaller # is preferred as the processor bandwidth available for PC operations will be limited |
| 6 | Total system Memory | In Kbytes | Larger the preferred |
| 7 | Currently available free memory | In Kbytes | Larger the preferred |
| 8 | Processor | Need guidelines to define classes for this element. For example,. ARM7 — 20 Mhz is class-1, etc. | Higher class processor is preferred |
| 9 | Max raw PHY bandwidth | maximum rate of PHY | Larger is better |
| 10 | Currently requested transmission bandwidth | This is the duration of the slot that is requested by the MMS once the PC is chosen | Smaller is chosen as there is more processor bandwidth to perform the PC operations |
| 11 | MAC address | The MAC address of the device | Larger MAC address is chosen. |

5.1.2.3.1 Original Master Device Still Communicating

Consider a situation where the original PC detects failures within itself. In this scenario, the PC searches the table of MMSs and picks an MMS with the largest number resources to take over its responsibility. If none of the APCs are currently operating, then the PC searches and wakes up the next APC in its list of APCs and hands over the responsibility. The list of APCs in the BSS can be maintained in a network management layer, which can be queried by the MAC layer management for such information.

5.1.2.3.2 Original Master Device Not Communicating

In this case, an APC detects the PC as absent. The APC tries to establish a connection with the PC by searching for it in all the channels and then instructs the rest of the APCs that it is taking over the responsibility of the PC. If there are multiple APCs volunteering for this responsibility then there will be voting among them as described above.

5.1.2.3.3 Alternate Master Device Still Communicating and Original Master Device Coming in Here, the originally designated PC detects an APC operating as PC. In this case, the original PC can instruct the currently operating APC to hand over the PC responsibilities, if such a change is required. Otherwise, the designated PC can associate itself as an MMS with the currently operating APC until there is a need for such a change.

5.1.2.4 Proxy Point Coordinator (PPC)

Figure 6:
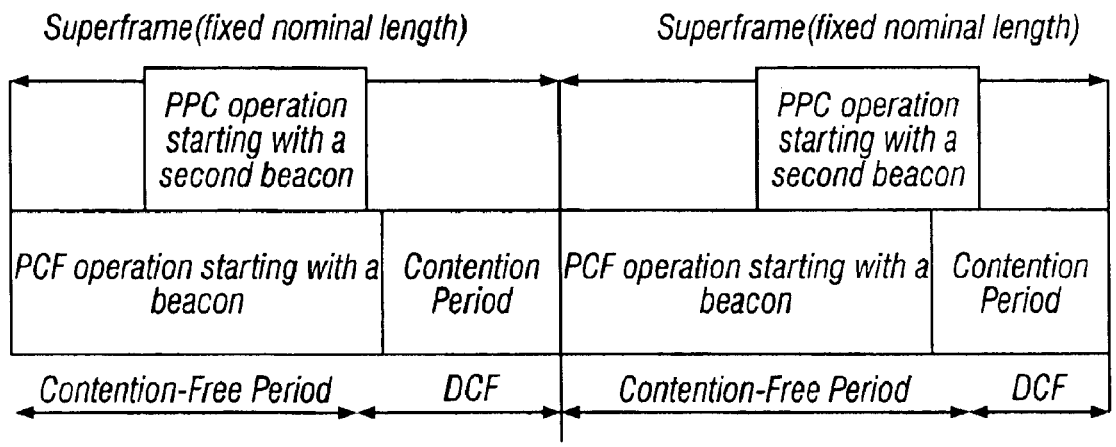
FIG. 6 illustrates the operation of a proxy point coordinator (PPC) within the contention free period (CFP) of a point coordinator (PC) in accordance with an embodiment of the present invention.

A proxy point coordinator is an MMS acting as a proxy PC between the actual PC and another MMS requesting connection with the PC. The option of becoming a PPC is an option to an MMS. A PPC comes into action when it recognizes the request from an MMS is going unanswered by the operating PC, for example because the MMS suffers from being a hidden node from the point of view of the PC. When an MMS recognizes the request calls from another MMS are going unanswered by the currently operating PC, then it volunteers to be a PPC. If it is not already associated with the operating PC, it so associates itself and obtains permission to be the PPC for the desired MMS. Once the operating PC permits such an operation, the PPC forms a tunnel between the operating PC and the desired MMS by repeating the frames from either STA to the other. The PPC also sends a beacon for use by the desired MMS. This beacon will have all the information from the beacon of the operating PC with the CF parameters appropriately adjusted to simulate a CFP within an existing CFP as shown in FIG. 6.

Even when a PPC is operating, all the MMSs are required to register with the PC wherever possible. Only in cases where the PC cannot receive signals from an MMS or the MMS cannot receive transmissions from the PC, should the MMS try to register with a PPC. The beacons from a PC and PPCs can be clearly identified by examining the CF parameters contained in the beacons. The CF parameters in a beacon from a PPC indicate a CFP contained within the duration indicated by the CF parameters in a beacon from the PC. Though an MMS can obtain transmission bandwidth from either a PC or a PPC, not both, it can receive frames at all times. This enables an MMS to receive transmissions from a device during a CFP of the PC and transmit during the CFP of a PPC or vice-versa. All the transmissions managed by PC or a PPC should use the same BBSS-SED.

5.1.3 Peer-to-Peer Connections Between Stations during a CFP

With this extension any two stations can request transmission time during a CFP and transfer data among themselves. This reduces the burden on an AP to grant such transmission time and provide the beacon service. In addition, this extension avoids the bandwidth overhead of an AP having to repeat data for the actual destination station.

5.2 QoS Related Extensions

One requirement in a QoS-enabled network is the guaranteeing of bandwidth to an acceptable extent. Hence this section deals with the extensions proposed to preserve bandwidth by reducing the overhead and dynamic management of network resources to provide optimal quality of service (QoS). Different parameters involved in QoS management are: the bandwidth for a stream of data, the latency of delivery, the priority of the data stream in accessing the network resource, and channel protection measures including any retransmission of lost data. This present scheme uses dynamic negotiation of these QoS parameters for streams of data on the network depending on the need of the data stream and availability of the network resources.

5.2.1 Enhancements to Contention-Free Period (CFP)

The basic definitions of a contention period and CFP do not change in the present scheme (i.e., from those used in the 802.11 specification). However, to simplify the operation, preserve precious bandwidth and achieve the required TDM operation the present scheme eliminates the poll+data+ack nature of transmissions during a CFP. All MMSs are required to send only the MM-frames during their allocated time period within each CFP periodically. Hence, the following features are required from the MMS/PC during a CFP.

- An MMS/PC need not send or expect MAC-level acknowledgements to any frame received during the CFP as this can disrupt the TDM operation of the network during the CFP.
- Acknowledgements to the frames during a CFP are sent or expected only as a MM-command once per superframe from an MMS/PC.
- An MMS is not allowed to send any non-MM frames during a CFP. Instead, such communications are limited to the contention periods within each superframe.
- An MMS/PC can send MM frames to another MMS/PC during contention periods expecting the MAC level acknowledgements starting within SIFS, similar to the acknowledgements currently defined in the 802.11 specification for control, data and management frames.

5.2.1.1 Use of Beacons for CFP by MMS and PC

Figure 7:
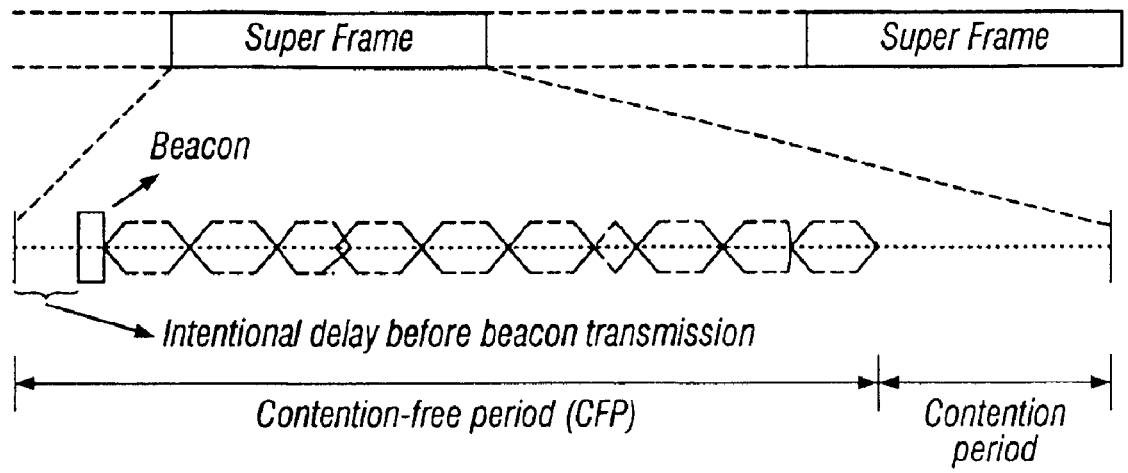
FIG. 7 illustrates transmissions of each MMSs in a superframe in accordance with an embodiment of the present invention.

The use of a beacon for the PCF remains essentially the same for the present scheme as is currently defined in the 802.11 specification, with the following enhancements (and see generally FIG. 7).

- The PC should indicate the next channel it intends to use in the channel field. This can be used by any overlapping BSSs to occupy the current channel after the current BSS moves over to the new channel.
- All the MMSs and PPCs make use of the beacon information after verifying the BBSS-SID contained in the beacon. The beacon period indicated by the CF parameters in the beacon from the PC may be used, so that if a beacon is lost because of channel corruption, the devices may still operate using the periodicity indicated by the previously received beacon. A PPC within one network is clearly distinguished from a PC of another network operating within the CFP of the same PC by the differences in their BSS-SID and BBSS-SIDs.
- NAV settings upon reception of a beacon by all non-MM stations are left unchanged from those defined currently by the 802.11 specification.
- All MMSs strictly adhere to the negotiations and agreed upon transmission times within a CFP as discussed in section 5.2.4. They transmit only during the allocated transmission slots within a CFP and have the freedom to contest for the time during contention period. Additionally all MMSs should make use of the guaranteed repetition of the beacon whose period is provided to them by the PC during the association.
- The PC should send the beacon with the appropriate beacon interval. The TBTT is set such that the actual beacon is sent out after a delay of (2*DIFS+RTS+CTS+3*SIFS+MaxData+Ack) from the start of the CFP (as defined in the 802.11 specification). This allows a non-MMS to have started its transmission just before the start of a CFP and still not affect the time of the beacon transmission. However, MMSs should know the actual start time of beacon transmissions and hence can make use of this period before the beacon, if available, for connection establishment purposes.
- The PC monitors the channel and recognizes the frames from STAs with the duration field set to exceed the NAV beyond the actual transmission of the beacon by the PC. If such a frame is detected during the CFP before the beacon, then the PC sends out a short dummy frame during the period of acknowledgement to that frame. This corrupts the acknowledgement frame and hence forces the STA to back off. This mechanism along with the above-proposed delay, guarantees the availability of channel time for a CFP at the period that the PC indicates in the beacon as the beacon interval.
- As the CFP is dynamically adjusted by the PC to optimize the channel throughput and is exact to the requirement of the TDM transmissions, there is no need of sending CF-end by the PC to indicate the premature end of CFP.

5.2.2 Support for MAC Layer Streams and their Priorities

Data streams are defined as logical connections over an existing association between an MMS and a PC. The concept of streams originates from the fact that Quality of Service (QoS) is important in providing a best possible transport service while optimally using the available network resources. The concept of streams helps clearly distinguish the data requiring different services, like bandwidth and latency, during the transportation at both the source and destination devices.

Each MMS can originate a set of data streams and can consume another set of data streams. For every data stream generation/consumption, an MMS needs permission from the PC and therefore negotiates the network bandwidth for the same. Each MMS can dynamically connect and disconnect any stream and can re-negotiate the parameters for an existing stream. The PC permits these activities depending on the available resources.

Figure 8:
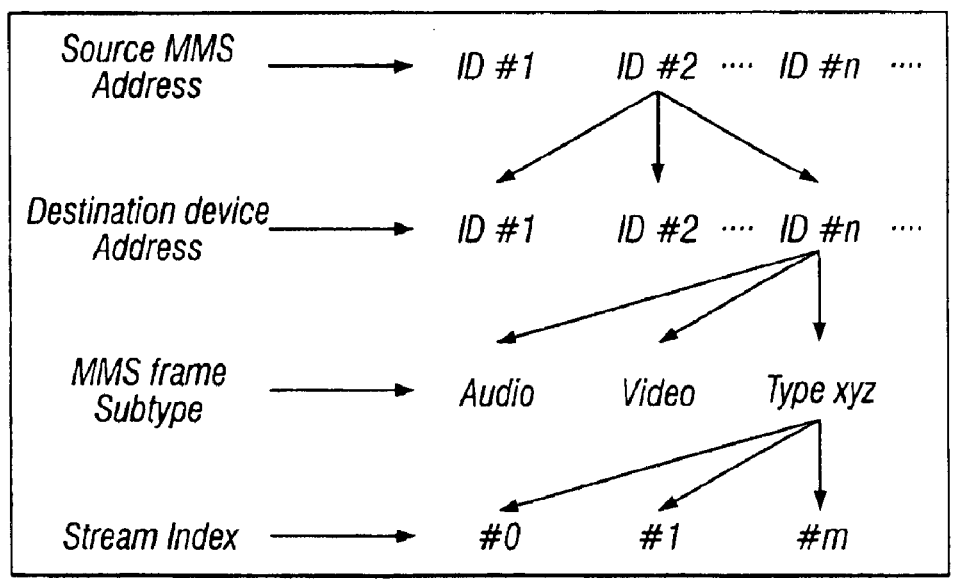
FIG. 8 illustrates a proposed data stream hierarchy in accordance with an embodiment of the present invention.

The hierarchy corresponding to the data streams is as shown in FIG. 8. Any two data streams on the network can be distinctly identified based on Source MMS address, Destination MMS address, MM frame subtype and stream index, which are transmitted with each packet. This means that any two types of streams originating from the same device can have the same stream index. Each stream needs to be connected when needed and disconnected when not needed by the source or destination device(s). Two exceptions to this are the basic command channel that is granted to each MMS during the association process and the data frames that have all zero stream indexes.

Each stream can be negotiated with different QoS requirements. In the case of multicast or broadcast, QoS with a default set of parameters is provided to the streams based on their subtype. The source MMS needs to collect retransmission requests from the entire set of destination MMSs for that stream and decide which frames need retransmission. The PC maintains the QoS and list of destination MMSs, termed a user list, for each data stream and exchanges this information with the destination MMSs of that data stream. As and when a device seeks to consume a data stream, the PC updates the user list for that data stream. If and when a device decides to stop using a data stream, it so informs the PC of its intention and the PC removes that device from the user list maintained for the corresponding data stream. When a user list becomes empty or when the source device decides to disconnect the data stream, the PC disconnects the stream. As and when any change is made to the user list of a data stream, including disconnection, all the current users of that data stream are informed of the change.

5.2.2.1 Handling Non-Stream Based Data

In any network there are always some data packets that need not be related to any of the streams. Examples of this are an ARP packet from an IP/IPX based network and one-time management packets. Stream indices of zero are reserved for such asynchronous data frames that do not need any consistent QoS parameters. Hence there are no connection/disconnection or QoS negotiations for streams with all zero stream indexes. Any device can use this all zero ID and send non-stream based data. Such streams are given the lowest priority (refer to section 5.2.3) in the network and retransmission parameters are set so as to provide very high numbers of retransmissions.

5.2.2.2 Stream Synchronization

Stream synchronization is defined as the process of restoring temporal relationships between various streams or elements that compose the multimedia information. In the present scheme, it is recommended that the stream synchronization be achieved using the sequence control field and the stream frame number in the header. The sequence control field in the header is used per stream in MM data frames unlike across all data types in the current 802.11 specification definition. However, the existing definition does not change for the non-MM frames during the contention period. The stream synchronization is not provided to streams with stream indexes of zero, which are non-stream data.

Stream synchronization is best explained with an example. Consider a video and an audio stream to be synchronized. At the source MMS, all the video data within a picture-frame are marked with a number equal to the index of the frame number modulo the total number of picture-frames that can be represented in the stream frame number field. This requires that the video generating section of the MMS provide an indication of the beginning of a picture-frame in the video bit stream. This indication is used to increment the running picture-frame index. Additionally, this indication is noted for time stamping the audio stream. The audio stream is time stamped as and when an audio data block is generated (or arrives at the MMS). These time stamps are utilized in determining the stream frame number for that audio data block during the transportation. Hence, for audio streams the stream frame number is assigned to each of the frames depending on the index of the picture-frame during which the data for that packet was generated.

The receiving device compares the stream frame numbers on the two streams it needs to synchronize. There should be sufficient buffering provided by the hardware based on the synchronization window that is requested for these streams. If a frame is lost within this window, a retransmission is requested and the data is delivered only after resynchronization at the receiving device. On the other hand, if the synchronization time window has elapsed and the frames are not yet correctly received, the retransmission request is aborted and the data is delivered with information on the missing frames. Additionally, the data-consuming agent can provide indications such as UNDERFLOW, NORMAL and OVERFLOW for each of the streams. This information is transported over to the MMS that is generating the stream 14 and is delivered to the data-generating agent so that the data rate of that stream is appropriately altered.

5.2.3 Priority Services

In the present scheme, a priority service is applied to different data streams. The priority of an entire stream is negotiated once for each stream during stream connection establishment. This priority is an indication of the range of latency and quality of delivery at the receiver side. As the priority is decided over a stream, each frame need not carry any priority bits in the header, thus saving network bandwidth.

Figure 9:
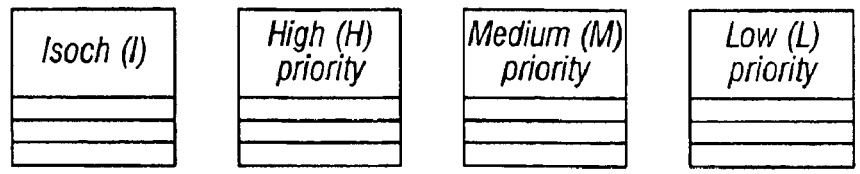
FIG. 9 illustrates proposed priority services for multimedia streams in accordance with an embodiment of the present invention.
Figure 9:
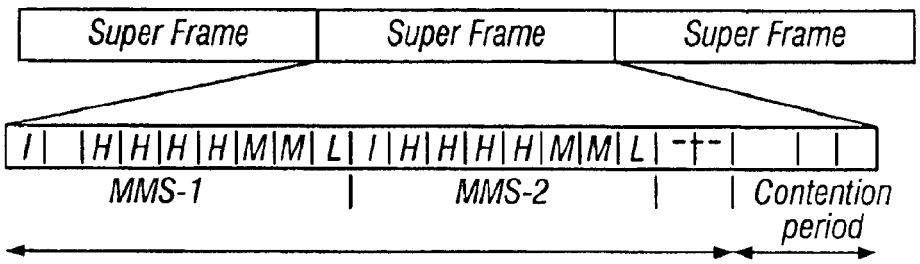

Apart from an isochronous priority, the present scheme contemplates the use of other (e.g., 3) levels of priorities, high, medium, and low (see generally FIG. 9). Isochronous streams are guaranteed the required bandwidth and a maximum limit on the latency. However, as the channel conditions may not permit low limits on the latency, it is recommended that the MAC layer abort any retransmission attempts and deliver the frames whenever the latency exceeds the negotiated time limit. The delivery of such frames should be carried out with appropriate information to the destination and source agents informing them of the aborted retransmissions.

Any remaining bandwidth, after allocation to all the isochronous streams, may be allocated to other priority streams in the order of their priority. At the source MMS, the frames may be differentiated by priority level, and should be buffered and queued to ensure that the frames of a specific data stream are never transmitted out of order. The packets are then transmitted out of the buffers according to a priority-based arbitration mechanism. Data that is not transmitted in a specified superframe is delayed using a random (e.g., round robin) early detection mechanism, starting with the lowest priority traffic first. The exact algorithm used in providing the priority service is not critical to the present invention.

5.2.4 Synchronization During CFP

Figure 10:
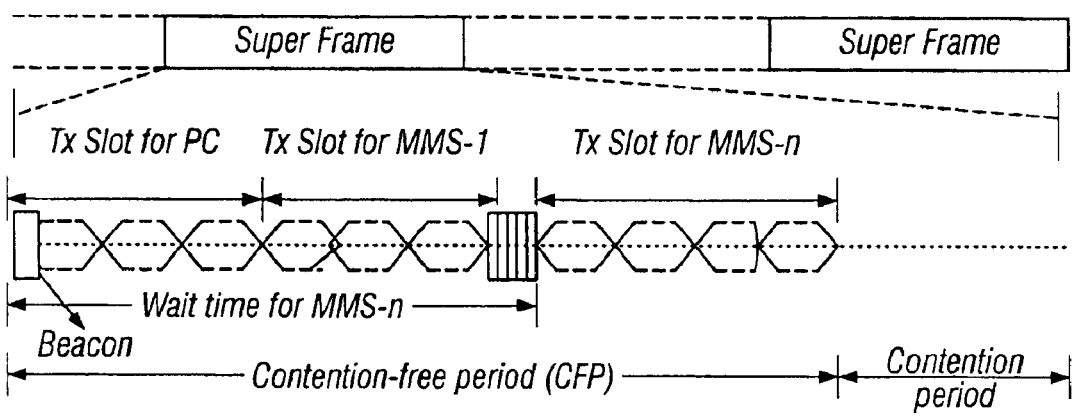
FIG. 10 illustrates transmissions of each MMSs in a superframe in accordance with an embodiment of the present invention.

Time synchronization between the PC and the MMSs during a CFP is important for TDM access of the channel. In the present scheme, this is made easy through the exchange of association agreements and other commands between the PC and MMSs. The parameters used to achieve the synchronization are the superframe size, the wait time for each MMS, transmission slot (duration) for each MMS and the address of the preceding MMS. This arrangement results in dynamically adjustable time slots for all the MMSs/PC during the CFP. This is also termed Dynamic Time Division Multiplexed Access (DTDMA). The dynamically adjustable slots and the related parameters of synchronization are described and illustrated in Table 3 and FIG. 10.

TABLE 3

Time Division style channel sharing by the devices in the BSS

| Slot type | Master Node | Client-1 | Client-2 | Client-3 | ... | Client-N | New Client |
|---|---|---|---|---|---|---|---|
| $S_0$ | Tx | Rx | Rx | Rx | Rx | Rx | Rx |
| $S_1$ | Rx | Tx | Rx | Rx | Rx | Rx | Rx |
| $S_2$ | Rx | Rx | Tx | Rx | Rx | Rx | Rx |
| ... | ... | ... | ... | ... | ... | ... | ... |
| $S_N$ | Rx | Rx | Rx | Rx | Rx | Tx | Rx |

A Superframe has the duration between two beacon transmissions indicating the start of a CFP from the PC. This parameter is determined based on the number of associated MMSs and their bandwidth/latency requirements. Wait time is the duration for which an MMS has to wait after receiving the beacon from its associated PC, before it can start transmitting Transmission slot is the allocated transmission duration (bandwidth) for each MMS in a CFP. All of these parameters may be passed in TU and TU is 1024 usec as currently defined in the 802.11 specification.

As part of the association agreements, the PC provides each MMS with these parameters. The MMSs honor this agreement by waiting in receive mode and starting transmission at the right time. While waiting, if an MMS detects an end of transmission indication from the preceding device, then it immediately starts its transmission. However, under no circumstances is an MMS allowed to extend its transmissions beyond its wait time plus the transmission slot duration.

The extra bandwidth, if any, detected by the current MMS can be used to send its queued up data. For example, if a client is supposed to wait for 20 msec and it detects the last packet of preceding client within 15 msec, then it can make use of the extra 5 msec.

Due to high packet losses in wireless channels accurate wait times are necessary in starting the transmission from a device. The end of transmission by the previous MMS is detected as any combination of three different ways: first, the preceding client may send a NULL MM-command packet. Second, the preceding MMS may send a frame with its frame position value set to '11'. This value means the current frame is the last frame from that MMS. Third, clear channel (CCA) detection may be used after one or more frames from the preceding MMS. The other values of frame position in frames from the proceeding MMS can also be used to predict the end of transmission of that MMS.

5.2.4.1 Variable Superframe Size

The PC dynamically sets the superframe size and such decisions are made known to all the associated MMSs before the change. The superframe size is determined based on the number of MMSs currently associated with the PC and the bandwidth/latency requirements of the isochronous streams. The actual algorithm used to decide the superframe size is not critical to the present invention.

5.2.4.2 Multiple Transmissions by a Device

Whenever the superframe size cannot be shortened due to the number of associated MMSs, an MMS requesting lower latency on an ongoing isochronous stream may be permitted to transmit in more than one discontinuous slots. The association agreements specify the number of slots and parameters (as described above) for all the slots. This mechanism is useful in cases such as transporting a VOIP (voice over IP) stream to one MMS along with a DVD-video stream to another MMS in the same superframe. The PC, depending upon the latency requested, decides the number of discontinuous slots to be used per frame.

5.2.4.3 Synchronization when Multiple BSSs Sharing the Same Channel

Figure 11:
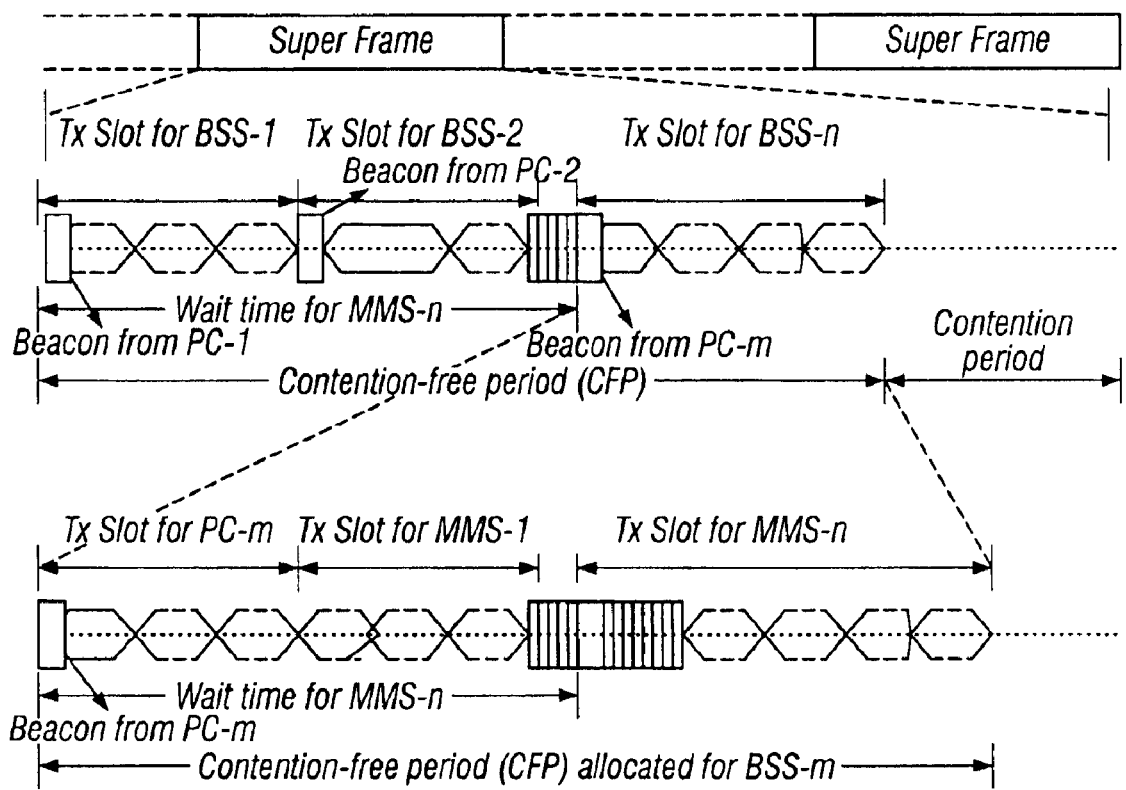
FIG. 11 illustrates transmissions of each BSS in an overlapping scenario in accordance with an embodiment of the present invention.

The operation of multiple BSSs sharing the same channel is described in section 5.2.5.3. This section describes the synchronization parameters and their usage (see generally FIG. 11). The synchronization parameters required and their use are very similar to those described above. They are: the superframe size, the wait time for each PC/BSS, the transmission slot (duration) for each BSS, the address of the PC of preceding BSS and the corresponding BSS-SD). The wait time at the PC-level for beacon transmission is strictly enforced to avoid any confusion in the network. These wait times are always measured from the initial synchronization beacon from the master-coordinator. This forms a two-stage wait time, where each PC waits for certain length of time from the beacon of master coordinator and the MMSs within the current BSS wait for a pre-negotiated length of time from the beacon of their associated PC.

5.2.5 Dynamic Bandwidth Management

This section describes the bandwidth management required in a multimedia network. Dynamic bandwidth management involves dynamic bandwidth negotiation between MMSs and the PC, a bandwidth requirement versus bandwidth allocation strategy at the PC and negotiations by multiple PCs to share the same PHY channel.

5.2.5.1 Dynamic Bandwidth Negotiation/Allocation within a BSS

Every MMS in the network can dynamically negotiate the required bandwidth with the PC for transmissions during a CFP. Using the same mechanism, an MMS can request a change in its allocated bandwidth at any time during its connection. Use of this feature is best explained using an example.

If an MMS is transporting video to another MMS, it may request a large bandwidth, which subsequently gets allocated. Later, intentional pauses in the video playback may result in the source MMS requesting a reduced bandwidth. Any extra bandwidth freed up by the new request can be utilized to transport other streams from the same MMS or streams from another MMS.

The PC keeps track of all bandwidth allocations. If an MMS requests more bandwidth than is currently available, then the MMS is allocated only the available bandwidth. The MMS may decide to use the allocated bandwidth (e.g., for a non-isochronous stream). On the other hand, if the bandwidth was requested for an isochronous stream, then the bandwidth allocation is rejected and the stream is not connected.

Each MMS should periodically collect the required bandwidth for each of its streams and divide the total bandwidth into four groups per the priority of the streams (isochronous, high, medium and low). This categorized bandwidth requirement may be transmitted to the PC periodically. At the PC, requests from all the MMSs are collected and analyzed against the available bandwidth. If the already allocated bandwidth is same as the available bandwidth any new requests are rejected. If there is some excess band width available, all the new requests for isochronous bandwidth are allocated first. Then the high, medium and low priority requests are visited, in that order. For this purpose the PC maintains a table listing the available bandwidth, allocated bandwidth for each stream priority at every MMS and the requested bandwidth for each stream priority at every MMS as shown in Table 4.

TABLE 4

Bandwidth requirements table maintained at the PC

|  |  | Allocated bandwidth | Required Bandwidth |
|---|---|---|---|
| PC | Isoch | 0.5 Mbs | 0.7 Mbps |
|  | High | . . . | . . . |
|  | Medium | . . . | . . . |
|  | Low | . . . |  |
| MMS-1 | Isoch | . . . |  |
|  | High | . . . |  |
|  | Medium | . . . |  |
|  | Low | . . . |  |
| . . . | . . . | . . . | . . . |

For bandwidth allocation purposes, the requirements of the PC are treated the same as any other device. If there is an isochronous request and there is no available bandwidth, then the PC has the option of renegotiating bandwidth with an MMS having the largest bandwidth allocated to the lowest priority that is currently entertained, other than the isochronous priority. The actual algorithm employed to allocate the bandwidth dynamically is not critical to the present invention.

5.2.5.2 Bandwidth Monitoring/Policing

The PC is required to monitor the transmissions during the CFP by all MMSs and take action if they do not conform to the agreed upon transmission duration. If an MMS is consistently under utilizing its allocated bandwidth, especially any isochronous bandwidth, the PC can renegotiate that extra bandwidth and allocate it to a needy MMS. Transmissions by an MMS beyond the agreed upon end of transmission time are strictly prohibited during the CFP. If the PC observes such behavior, it can disassociate the offending device. For this purpose, a new reason code is made part of the present scheme for the disassociation of an MMS by the PC as described above in section 4.7.

5.2.5.3 Collision free Channel Sharing with Overlapped BSS

The operation of a CFP in overlapped BSSs is an unsolved problem in the current version of the 802.11 standard. This is especially difficult in those PHY mediums, like DS-SS, where there are limited numbers of channels in which to operate. This present scheme has solved this problem and has achieved the operation of overlapping BSSs in the same channel by sharing the bandwidth during a CFP through appropriate negotiations by the corresponding PCs. The BSS-SID along with the BBSS-SID is used to achieve the synchronization among the transmissions of PCs of all the overlapping BSSs.

An example of such channel sharing for a two-channel PHY medium is described with reference to FIG. 12. As the number of channels increase for the PHY medium, congestion decreases and provides for a better probability of channel availability for the BSSs. All the negotiations by the PCs for the bandwidth during CFP may use the bits "To DS" and "From DS" set to 1.

In the illustrated example, BSSs A, B, C and D are physically located in one plane and BSS E is located in another plane. Logically, BSSs B, C and D share channel-1 and BSSs A and E share channel-2. BSS B comes up first and assumes an all zero BSS-SID in channel 1 with 10% bandwidth utilization. BSS A comes up next and assumes an all zero BSS-SID in channel 2 with 80% bandwidth utilization.

Now, when BSS D comes up it determines that both channels are busy. Channel-1 is recognized as having the lowest bandwidth utilization and so BSS D requests 30% of the bandwidth in channel-1. BSS B and D thereafter share Channel-1 with 10% and 30% bandwidth usage respectively.

When BSS C comes up, it detects both channels being busy and recognizes that channel-1 has the lowest bandwidth utilization. Therefore, BSS C requests 40% of the bandwidth in Channel-1, and BSS B, C and D share Channel-1 with 10%, 40% and 30% bandwidth usage respectively.

When BSS E comes up it recognizes that both channels are busy and that Channel-1 and Channel-2 have approximately the same bandwidth utilization. However, Channel-2 is determined to have the fewest number of BSSs operating, so BSS C requests 40% of the bandwidth in Channel-2 and BSS A and E share Channel-2 with 60% and 40% bandwidth usage respectively.

A more general discussion of these mechanisms is presented in the following sections.

5.2.5.4 First BSS Coming Up

Whenever a BSS occupies a channel, after association by an MMS, the PCs of all the other overlapping and non-operational BSSs search for a free channel. If there is a free channel available, all the PCs of the other overlapping BSSs move over to the new channel. If there is no other channel that is available, the PCs choose a channel that currently has low bandwidth utilization. This is based on the observed length of a CFP. This calls for the PCs to periodically assess the bandwidth utilization and find a free channel or a channel with low bandwidth utilization.

When an MMS from any BSS associates with the corresponding PC and requests contention free service, the PC establishes a CFP and can allocate the bandwidth up to the maximum limit of the CFP in a channel. In this condition, the PC assigns itself the all zero BSS session ID (BSS-SID). The PC with the all zero BSS-SID is termed the master coordinator (MC), as this PC coordinates all the future bandwidth negotiations among the BSSs. If all the MMSs disconnect before any other BSS tries to use the same channel, the PC shuts off its own transmissions and parks itself in a relatively free channel. The following sections describe the scenario of multiple BSSs trying to use the same channel while there is already another BSS operating on the same channel.

5.2.5.5 More BSSs Coming Up in the Same Channel

This section assumes that all the PCs from overlapping BSSs can receive transmissions from one other very well. The next section describes a scenario where two overlapping networks need not have their PCs receiving transmissions from one other very well.

After the first BSS starts CFP operation as described in section 5.2.5.4, if an MMS from second BSS gets associated with its PC, the new PC looks for a channel with the shortest CFP operation and/or fewer number of BSSs sharing that channel. If a totally free channel is found, the new BSS starts operating in that channel. The corresponding PC would assign itself an all zero BSS-SI) and assume the responsibility of the master coordinator in that channel.

Otherwise, the new PC sends PC-level MM-commands to the MC requesting bandwidth for its operation. The MC should allocate the next available BSS-SID to the new BSS and accommodate its request up to 50% of the CFP for the new BSS's operation. As these negotiations are at the BSS level, all BSSs are treated the same and are entitled to an equal share of the total bandwidth. Hence, as more and more BSSs start operating, the bandwidth available to each BSS is limited to the total bandwidth in the channel equally divided among all the BSSs. For example, when three overlapping BSSs operate in the same channel, they should each be guaranteed up to one third of the total bandwidth. When a BSS requests a lower bandwidth than its share, the remaining bandwidth may be shared among all the other operating BSSs in the same channel.

The master coordinator is responsible for issuing BSS-SIDs to the new BSS. For all the initial negotiations with the MC, the new PCs may use an all one BSS-SID. In addition to the BSS-SID, the BBSS-SID, source address and the destination addresses are used to clearly distinguish the frames from/to multiple numbers of new PCs negotiating for the CFP with MC. The MC is responsible for keeping track of all the bandwidth negotiations and communicating same to all the current bandwidth-sharing PCs periodically. This information may be maintained in a separate table designated for this purpose. Such a table may include all the currently operating BSSs with their BSS-SID, BSS ID, the bandwidth requested and the bandwidth allocated. The master coordinator conducts a re-negotiation with all the operating BSSs so as to provide a fair share in the bandwidth to the new incoming BSS.

All the PCs, especially those that have been allocated less than an equal share of the total available bandwidth, periodically check the other channels for low bandwidth utilization. This is done after informing the master coordinator that such a check is being made so that the originally negotiated bandwidth is retained while the current PC is checking other channels. An exception to this rule is when the master coordinator is in the presence of at least one other PC sharing the channel bandwidth. The master coordinator is prevented from being temporarily absent from the current channel so that the BSS-level synchronization is always maintained. The time duration between two channel checks is suggested to be random to avoid multiple BSSs changing channels at the same time. Whenever a BSS that is sharing bandwidth in a channel finds another channel with better bandwidth characteristics, it informs the master coordinator before changing channels so that its current bandwidth is freed up. Additionally, the channel check is performed only when a new MMS in a BSS is coming online and hence the BSS needs more bandwidth. This avoids unnecessary channel checks and channel changes even when all the BSSs can operate within the available bandwidth in any one channel.

Whenever a master coordinator decides to close its operation, it instructs the PC with the next lowest BSS-SD to take over the responsibilities of master coordinator. Along with such an instruction, the entire BSS-SID table is passed to the new master coordinator in a broadcast packet. The new master coordinator starts using the all zero BSS-SID and instructs its clients to do the same. During this hand over, requests from new BSSs are not entertained.

5.2.5.6 Proxy-Coordinator Mode of a Device

This section describes the operation of overlapping BSSs when the PCs cannot receive transmissions from each other while at least one of the operating MMSs can receive from both PCs. In this scenario, discussed with reference to FIG. 13, the MMS that can receive transmissions from both the PCs assumes the responsibility of a proxy-coordinator and coordinates the negotiations between the two PCs.

Assume BSS B comes up first and starts using an all zero BSS-SID. BSS D comes up next and requests bandwidth sharing with B. BSS C comes up next and requests bandwidth sharing with B and D. Then BSS A comes up.

Assume now that BSS B cannot detect A and/or A cannot detect B. BSS D detects both A and B and reports to B that A is operating in the same channel. B assigns D as a proxy coordinator and sends a response to the request of D for bandwidth sharing. D acts as tunnel between B and A. Through D, A then receives an invitation from B to join the already group existing group of B, C and D. A is assigned a BSS-SID and the synchronization parameters with respect to D's transmission of a beacon.

Now suppose BSS E comes up. Assume that except for $C_{c1}$ (a client of C), no other device can detect E and/or vice-versa. E may try to use another channel but suppose this attempt fails. There is only one option to E and that is to join the same group formed above, otherwise it will be interfering with $C_{c1}$.

To accommodate E, $C_{c1}$ detects request from E and reports to C that E is operating in the same channel. C tunnels the information to B and B assigns $C_{c1}$ as a proxy coordinator and sends a request to C seeking permission for such operations. C agrees to the request and provides the permission. Thus, C and $C_{c1}$ together form a tunnel between B and E. E is assigned a BSS-SID and the synchronization parameters with respect to $C_{c1}$'s transmission of first packet.

In general, these operations can be described as follows:

The incoming new PC detects frames from a group of BSSs and it sends its request to the master coordinator for admission into the group. If the master coordinator does not respond, the new PC continues to send the same request, implying a request for proxy-master service. Any MMS that can hear two PCs, one using an all zero BSS-SID and another one using all one BSS-SD, can volunteer for the responsibility of being a proxy-coordinator with its PC. Its PC can offer this service to the community after negotiating with MC. If the PC itself can receive from both the MC and the incoming new PC, then it may choose itself as a proxy coordinator. On the other hand, if the current PC cannot receive transmissions from the new PC and there are multiple MMS offering to act as a proxy coordinator, the associated PC may choose one of them randomly. However, an immobile device is always preferred over a mobile device for the reason that the mobile device may move out of the overlapping physical region. Additionally the MMS with the capability of becoming a PC is preferred over others and the responsibility of the current PC is handed over to the chosen MMS to simplify the network operations.

Upon receiving tunneling offers from multiple BSSs, the MC can accept an offer from only one of them. Once the MC accepts an offer, the volunteering MMS/PC is allowed to repeat only the MM-command frames between the MC and the new PC. Once the MC allocates a BSS-SID, it is supplied to the volunteering MMS so that the tunnel service is reserved between the MC and the negotiated PC. If the MMS needs to be disassociated, it informs both the MC and the attached PC, and provides sufficient time for them to choose a new path for the tunnel before disassociating itself. In the case of sudden failure of the tunnel, the disconnected PC starts sending request frames using an all one BSS-SID and starts the negotiations again.

An MMS from a BSS operating with the assistance of a proxy coordinator should not itself be a proxy coordinator. This avoids the chain effect of proxy coordinators, which can lead to a disastrously long chain of BSSs sharing bandwidth in the same channel.

The number of BSSs connected to a group of BSSs through proxy coordinators should be limited. This number may be computed based on the number of overlapping BSSs and the number of different channels available. For example, in a cubic problem of four overlapping BSSs in a plane, overall there are 12 overlapping BSSs. With at least two different channels being available, six overlapping BSSs will be active in each channel. That is, four BSSs in the same plane as the master coordinator and one BSS in each of the other two planes. Hence, the number of BSSs connected by proxy coordinators can be two, though four may be safer. If a BSS cannot get its channel bandwidth share because of the need for a proxy coordinator, then it should try the next best channel available.

5.2.5.7 A New Device Detects Two Master Coordinators

Consider the case of two sets of BSSs already operating in the same channel without detecting each other. If a new MMS ($C_x$) that is associating with one of the PCs detects two master coordinator packets ($MC_x$ and $MC_y$) with different BSS-IDs, then it reports the condition to its PC ($M_x$). The best solution to this scenario is the BSS corresponding to the new device choosing to operate in another channel, as otherwise it becomes a confusing bridge between two physically separated BSS groups. Hence the PC $M_x$ should try to move its operation from the current group to another group in a different channel. If that is not possible, then $M_x$ should inform the associated master coordinator ($MC_x$) of the situation and offer $C_x$ as a proxy-coordinator. The master coordinator ($MC_x$) broadcasts the existence of such a situation to all the BSSs and sends the negotiation command to $MC_y$ through $C_x$. The group with the lowest number of BSSs or the group with the lowest bandwidth utilization dissolves the current group and joins the other group. This means the BSSs joining the new group will be assigned new BSS-SIDs and hence there can potentially be momentary interruption in network operations.

5.2.6 Robustness against Channel Variations

As all isochronous streams, by nature, are not retransmitted, they are highly vulnerable to channel losses. The channel losses could result in unacceptable quality of streams, like audio and video, or could even result in the receiving device not using the stream for a time period much longer than the channel loss duration. To avoid these situations, the present scheme uses both error correction coding (ECC) and cyclic redundancy check (CRC) mechanisms. Each receiving MMS can request either ECC or CRC or both for a stream. With FCC, the isochronous streams become much more usable even under severe wireless channel conditions. One potential FCC scheme is based on Reed Solomon coding with variable protection capability. The ECC is applied to all streams of all priorities depending on the negotiations made during the stream connection establishment process.

5.2.6.1 Cyclic Redundancy Check Scheme

An ECC scheme similar to that defined in the 802.11 specification may be used.

5.2.6.2 Error Correction Scheme

The present scheme allows for the use of a (255, k) Reed-Solomon coder over $GF(2^8)$. The information rate, 'k', can be negotiated depending on the RF channel conditions and requirements according to the characteristics of the data stream. Each data frame (including the header) is split into blocks of k symbols (each symbol is a byte long) and ECC is carried out to form 255-byte blocks. The last ECC block in the frame can contain less than 'k' information symbols.

5.2.6.3 Interleaving

Interleaving is useful if implemented with a large interleaving depth. This may affect the flow of latency sensitive streams. Hence interleaving may be left to the layers above the MAC where it can be carried out at the stream level to improve the performance of unidirectional streams.

5.2.6.4 Retransmissions of frames

In the present scheme, stream level retransmissions based on a Selective Auto Repeat reQuest (ARQ) mechanism during a CFP may be used. The retransmission requirements of streams vary depending on their type, bandwidth requirements and latency requirements. For example, file transfers based on TCP/IP streams may not need retransmissions at the MAC layer at all, while streams generated by devices without TCP/IP support might need complete retransmission support. During the connection establishment period, the receiving device should be able to negotiate the different parameters involved in the selective ARQ, like retransmission window size, timeouts, etc., that suit the bandwidth and latency requirements of that stream. All retransmission requests are sent back to the source MMS in the MM frame subtype command in the next available superframe.

5.2.6.5 Dynamic Channel Changing

Channel changing may occur in two situations. First, channel changing may occur during the association of an MMS, if the MMS and the PC are in different channels. Second, channel changing may occur during the operation of a BSS when the current channel of operation has only low throughput to offer, either due to too many BSSs sharing the channel or due to high interference. The following paragraphs describe these two situations and explain the process of changing the channel of operation.

The PC of a BSS should always try to operate in a relatively free channel unless all the devices are in the DCF-only mode of operation. This is true even when the BSS does not have any MMSs. When an MMS wakes up and needs an association, it searches all the possible channels for a PC by sending its request and timing out in each channel before changing over to the next channel. This assures that an MMS always finds the PC even if they are in different channels to start with.

When the PC recognizes the association request from an MMS, it authenticates the MMS and at the same time starts negotiations with the BSS-group, if any, which is currently operating in the channel. Once the PC obtains the duration for its own CFP, it sends the beacon in the channel at its TBTT. The MMS requests the bandwidth, obtains a connection with another MMS and starts using the channel. If the MMS that needs to be connected is in another channel, it is the responsibility of the PC to instruct the first MMS to remain quiet and search the other channels for the second MMS. The PC therefore sends requests in each channel addressed to the second MMS, requesting that this MMS move to the original channel of operation and establish a connection.

The second situation requiring channel selection occurs when the PC or one of the MMSs experiences serious channel impairments despite higher degree of ECC. Each MMS and PC in the BSS measures the channel status in terms of packet error rates and packet loss rates that they are experiencing. The MMSs send the measured channel status to the PC periodically. Using the channel status from all the MMS and the one measured locally, the PC may decide to change channels and move the network operations to a better channel. The mechanism used to determine whether or not to change channels is not critical to the present invention.

Once the PC decides to leave a current channel, it searches for another free channel. Thus, all the MMSs are instructed to remain quiet for a while through a broadcast message and the PC snoops other channels for operation of BSSs or for the stray energy measured in terms of CCA mechanisms. As all the MMSs are required to remain quiet due to the absence of a beacon from the associated PC, there will be a momentary pause in the network operations during this process.

If a free channel is found, the PC switches back to the original channel, broadcasts a change channel message to all the MMSs and expects acknowledgements back from each individual MMSs. Each MMS changes channel only after it sends its acknowledgement more than once to the change channel command from the PC. If an MMS does not respond, the PC performs a predefined number of attempts to reach it and then decides that the MMS is unreachable. Similarly the MMS can decide that the PC is unreachable after waiting for a predefined length of time and start searching for the PC in other channels.

The PC changes channels after all the MMSs have responded or after the time out condition. Once in the new channel, the MMS wait for the beacon from the PC to start communications. The PC broadcasts the change channel message, with the indication of the destination channel as the current channel, to announce its presence in the new channel and expects acknowledgement from each MMS. If an MMS does not respond within a predefined number of attempts, the PC decides that the MMS is disconnected. After identifying all the MMSs the PC starts regular network operations. If a BSS is currently sharing bandwidth with other BSSs, the PC of the BSS that is changing channels should inform the MC before moving the network operations over to a new channel.

After deciding to change the channel, if a free channel is not found, the PC simply returns to the original channel and broadcasts a change channel message with the current channel as the destination channel. After this broadcast it starts normal operations by sending out beacons and expecting the MMSs to communicate as before.

5.3 Future Proof

A network protocol should inherently provide the basic support required for future upgrades. The present scheme uses two extensions for that reason. They are the network feature update and the reservation of protocol version bits for dynamic negotiation of the protocol header and fields in the header. These extensions are discussed in detail in the following sections.

5.3.1 Network Feature Update

The proposed MM frame subtype for network feature updates allows the MMSs to obtain the most recent protocol/firmware/software from any other MMS that has access to such information via connections like Internet. The PC is required to check the version of the MMS during the association and request another MMS (or itself) to update the current MMS. The actual algorithm used for verification and the version numbers supplied during association is not critical to the present invention. As streams are supported for all the MM frame types, a MMS can update a maximum of 255 devices at any given time.

5.3.2 Protocol Version Value of '11'

To encourage future innovative developments within the limits of 802.11, the present scheme reserves the '11' value of the protocol version bits in the frame control field. The value 11 of the protocol version bits can be used for dynamic negotiation of the frame header content and size in the following manner.

All MMSs in the network maintain two lists. The first list contains all the supported fields in the frame header, their default positions and their default lengths in bits. This list can be updated in the future for more fields in the frame header. The second list is a subset of the first list containing only those fields supported in the current session, the actual position and length of these fields. The MMSs that needs a change in the format can use the basic header format, as currently defined, to associate and request the change using appropriate MM commands.

When the newly negotiated frame header format is used, the protocol version bits should be set to '11' and this format should be made known to all the related MMS. If an MMS cannot accept the new format it should still be able to communicate with the new device using the currently defined frame header format. This way, a BSS can have a combination of old and new generation devices but still keep the devices communicating with each other. The newer generation devices can have new services offered when they communicate with the same generation devices. Since these negotiations are connection oriented, an MMS can negotiate a different header format with each MMS that it is currently connected to. Nevertheless, if there is a change in the frame header format, it is applicable to all the frames communicated between the two involved MMSs. All the multicast and broadcast frames should make use of the currently defined format. All the control frames defining basic services like association, re-association and disassociation should make use of the currently defined format.

6. Backward Compatibility of the Proposed Extensions

All MMS and PCs Support DCF based operations for backward compatibility. However, there are additional enhancements proposed to the operation of DCF-only devices to achieve improved network utilization.

For example, like the FH stations, DS stations should also refrain from transmitting a frame if there is not enough time for the entire frame plus the expected acknowledgement packet, if any, before the start of the next CFP. For this purpose FH stations should make use of the CFP in the beacon sent by the PC. Additionally, if the STAs continue to use this parameter even when a few beacons are lost due to channel corruption, a better CFP operation can be achieved. A timeout of one second or so may be used by the STAs to revert back to the contention-only operation (no CFP) from the time they receive a beacon from the PC announcing CFP operation.

When multiple fragments are being transmitted (refer to section 9.2.5.6 in the 802.11 specification) from an STA (non-MM), it should still honor the CFP and refrain from transmitting a fragment if there is not sufficient time for the entire fragment and the expected acknowledgements before the CFP. In addition, no STA should set the duration in the frame to extend beyond the start of the CFP.

Dynamic channel changes should be supported by the MAC protocol itself and not rely on an application above that layer. Therefore, one control frame subtype should be reserved for this purpose and one for the corresponding acknowledgement. The actual mechanism of deciding whether or not to change channels need not necessarily be defined. Additional control subtypes for channel statistics reports, and acknowledgement, between DCF-only devices and an AP should also be provided so that the STAs can report the measured channel status back to the AP to assist in the decision of whether a channel change is necessary.

Thus a set of multimedia extensions for WLANs has been described. Although discussed with reference to specific embodiments, it should be remembered that the present invention is only to be limited in terms of the claims that follow.

What is claimed is:

1. A method comprising controlling access of computer network components to the networks communication medium as specified by a medium access control (MAC) protocol, the MAC protocol describing a MAC header comprising multimedia (MM) extensions, including a MM control field, to facilitate the communication of MM data between the network components, the MM control field including at least one subfield selected from the group consisting of a subfield indicating a number of bytes padded with zeros in a current frame, a subfield identifying a group of network components communicating with a network component designated as a point coordinator, a subfield indicating an index number for a multimedia stream being transmitted between network components, and a subfield indicating a frame number of a multimedia data stream frame associated with said MM control field.

2. The method of claim 1 wherein the communication is via a wireless medium.

3. The method of claim 2 wherein the communication is a radio frequency communication.

4. The method of claim 3 wherein the radio frequency communication comprises frequency hopping spread spectrum schemes.

5. The method of claim 3 wherein the radio frequency communication comprises direct sequence spread spectrum schemes.

6. The method of claim 2 wherein the communication is an infrared communication.

7. The method of claim 1 further comprising a multimedia capability indicator in a management frame.

8. The method of claim 1 wherein the MAC protocol further defines a capability field within a management frame, the capability field comprising information regarding the network component multimedia capabilities.

9. The method of claim 1 further comprising a set of parameters included in the initial communications between two network components, the parameters indicating whether the channel of communications is shared and/or the type of network component including proxy coordinator and master coordinator.

10. The method of claim 1 further comprising a definition for a multimedia command frame.

11. The method of claim 10 wherein the multimedia command frame comprises multiple commands and acknowledgements transmitted from a one network components to one or more of the network components.

12. The method of claim 11 wherein a one network component groups two or more multimedia commands intended for a second network component in a command sub-block.

13. The method of claim 12 wherein the multimedia command frame further comprises a destination address and the command sub-block length.

14. The method of claim 1 further comprising a frame control field (FC) wherein a type for multimedia data communication may be indicated.

15. The method of claim 14 wherein the FC field consists of the first 16 bits of the MAC header transmitted by the network component.

16. The method of claim 1 wherein the MM control field comprises a frame position subfield.

17. The method of claim 1 wherein the MM control field consists of 24 bits.

18. The method of claim 17 wherein the 24 bit MM control field consists of five sub-fields.

19. The method of claim 18 wherein the five sub-fields consist of:
  a first 2-bit sub-field indicating a frame position within a series of frames,
  a second 2-bit sub-field indicating the number of bytes padded with zeroes in the current frame to make the entire frame 4-byte aligned,
  a third 4 bit sub-field indicating an identification number assigned to a group of network components communicatively coupled and controlled by a one computer network component designated as a point coordinator,
  a fourth 8-bit subfield indicating an index number for a multimedia data stream being transmitted between the network components,
  a fifth 8-bit sub-field indicating a frame number of a multimedia data stream frame associated with said MM control field.

20. The method of claim 1 wherein the MM control field is the last MAC header field transmitted before transmitting a frame body.

21. An interface between a computer system and a computer network, the interface comprising an implementation of a medium access control (MAC) protocol wherein multimedia data communication extensions, including a multimedia control field, are available for communicating multimedia date to or from other network components, the multimedia control field including at least one subfield selected from the group consisting of a subfield identifying a number of bytes padded with zeros in a current frame, a subfield identifying a group of network components communicating with a network component designated as a point coordinator, a subfield indicating an index number for a multimedia stream being transmitted between network components, and a subfield indicating a frame number of a multimedia data stream frame associated with said MM control field.

22. The interface of claim 21 wherein the interface is a network interface card (NIC).

23. The interface of claim 21 wherein the interfacing occurs via a wireless medium.

24. The interface of claim 23 wherein the interfacing occurs via a radio frequency communications.

25. The interface of claim 24 wherein the radio frequency communications comprise frequency hopping spread spectrum techniques.

26. The interface of claim 24 wherein the radio frequency communications comprise direct sequence spread spectrum techniques.

27. The interface of claim 23 wherein the interfacing occurs via infrared communications.

28. A system communicatively coupled to other systems in a computer network, the system comprising a network interface that implements a medium access control (MAC) protocol to control access to the networks medium, the MAC protocol defining a MAC header that comprises multimedia (MM) data communication extensions, including a MM control field, the MM data communication extensions available for communicating multimedia data to or from other network components or systems communicatively coupled to the network, and wherein the MM control field includes at least one subfield selected from the group consisting of a subfield indicating a number of bytes padded with zeros in a current frame, a subfield identifying a group of network components communicating with a network component designated as a point coordinator, a subfield indicating an index number for a multimedia stream being transmitted between network components, and a subfield indicating a frame number of a multimedia data stream frame associated with said MM control field.

29. A machine-readable medium that provides instructions, which when executed by a machine, cause said machine to communicate in a computer network by accessing the communication medium in accordance to a medium access control (MAC) protocol that describes a MAC header comprising multimedia (MM) extensions, including a MM control field having a least one subfield selected from the group consisting of a subfield indicating a number of bytes padded with zeros in a current frame, a subfield identifying a group of network components communicating with a network component designated as a point coordinator, a subfield indicating an index number for a multimedia stream being transmitted between network components, and a subfield indicating a frame number of a multimedia data stream frame associated with said MM control field.

* * * * *

UNITED STATES PATENT AND TRADEMARK OFFICE
CERTIFICATE OF CORRECTION

PATENT NO. : 6,865,609 B1
DATED : March 8, 2005
INVENTOR(S) : Rajugopal R. Gubbi and Gregory H. Parks It is certified that error appears in the above-identified patent and that said Letters Patent is hereby corrected as shown below:

<u>Column 9,</u>
Line 65, "MS" should be -- MMS --.

<u>Column 13,</u>
Line 23, after "PC" -- 95 -- should be deleted.

<u>Column 20,</u>
Line 27, after "stream" -- 14 -- should be deleted.

<u>Column 23,</u>
Line 2, "band width" should be -- bandwidth --.

<u>Column 24,</u>
Line 2, "land" should be -- 1 and --.
Line 64, "BSS-SI)" should be -- BSS-SID --.

<u>Column 25,</u>
Line 53, "BSS-SD" should be -- BSS-SID --.

<u>Column 26,</u>
Line 36 "SD" should be -- SID --.

<u>Column 27,</u>
Line 54 "FCC" should be -- ECC --.

UNITED STATES PATENT AND TRADEMARK OFFICE
CERTIFICATE OF CORRECTION

PATENT NO. : 6,865,609 B1
DATED : March 8, 2005
INVENTOR(S) : Rajugopal R. Gubbi and Gregory H. Parks It is certified that error appears in the above-identified patent and that said Letters Patent is hereby corrected as shown below:

Column 32,
Line 30 "identifying" should be -- indicating --.

Signed and Sealed this

Seventh Day of June, 2005

JON W. DUDAS
*Director of the United States Patent and Trademark Office*